United States Patent
Ji et al.

(10) Patent No.: US 9,226,312 B2
(45) Date of Patent: Dec. 29, 2015

(54) RESOURCE MANAGEMENT SYSTEM AND METHOD FOR INTER-CELL INTERFERENCE COORDINATION IN WIRELESS COMMUNICATION SYSTEM

(75) Inventors: Hyoung Ju Ji, Seoul (KR); Joon Young Cho, Suwon-si (KR); Ju Ho Lee, Suwon-si (KR); Jae Chon Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 404 days.

(21) Appl. No.: 13/290,395

(22) Filed: Nov. 7, 2011

(65) Prior Publication Data

US 2012/0113812 A1 May 10, 2012

(30) Foreign Application Priority Data

Nov. 8, 2010 (KR) .................. 10-2010-0110616

(51) Int. Cl.
*H04W 72/12* (2009.01)
*H04W 72/04* (2009.01)

(52) U.S. Cl.
CPC ........ *H04W 72/1263* (2013.01); *H04W 72/042* (2013.01); *H04W 72/048* (2013.01); *H04W 72/0426* (2013.01)

(58) Field of Classification Search
CPC ... H04J 13/0062; H04W 24/00; H04W 28/04; H04W 48/16; H04W 92/20; H04W 16/10; H04W 24/10; H04W 28/16; H04W 16/02; H04L 1/00; H04L 5/00; H04L 5/0023; H04L 5/0048; H04L 5/0053; H04L 5/0091; H04L 5/0073
See application file for complete search history.

(56) References Cited

U.S. PATENT DOCUMENTS

| | | | |
|---|---|---|---|
| 5,592,490 A | 1/1997 | Barratt et al. | |
| 2010/0272018 A1 | 10/2010 | Furueda et al. | |
| 2011/0149894 A1* | 6/2011 | Luo et al. | 370/329 |
| 2011/0170496 A1* | 7/2011 | Fong et al. | 370/329 |
| 2011/0249611 A1* | 10/2011 | Khandekar et al. | 370/315 |
| 2011/0249642 A1* | 10/2011 | Song et al. | 370/329 |
| 2012/0082052 A1* | 4/2012 | Oteri et al. | 370/252 |
| 2013/0033998 A1* | 2/2013 | Seo et al. | 370/252 |

(Continued)

FOREIGN PATENT DOCUMENTS

| | | |
|---|---|---|
| CN | 101583190 A | 11/2009 |
| CN | 101873597 A | 10/2010 |
| WO | 2011/122833 A2 | 10/2011 |

OTHER PUBLICATIONS

Samsung, "Support of time domain ICIC in Rel-10", 3GPP TSG RAN WG1 Meeting #62bis, R1-105406, Oct. 11-15, 2010.

(Continued)

*Primary Examiner* — Yee Lam
(74) *Attorney, Agent, or Firm* — Jefferson IP Law, LLP

(57) ABSTRACT

A resource management system and method for inter-cell interference coordination and channel information feedback in a mobile communication system are provided. The resource management method includes transmitting an Almost Blank Subframe (ABS) set from a first base station to a second base station, transmitting a reference resource configuration set for channel measurement and a Radio Link Monitor/Radio Resource Measurement (RLM/RRM) for radio resource measurement from the second base station to a terminal, and scheduling, at the second base station, the terminal in a subframe selected from the ABS set.

20 Claims, 20 Drawing Sheets

(56) References Cited

U.S. PATENT DOCUMENTS

2013/0155999 A1* 6/2013 Seo et al. .................. 370/329
2013/0223393 A1* 8/2013 Jung et al. .................. 370/329

OTHER PUBLICATIONS

Nokia Siemens Networks, et al., "TDM eICIC coordination between macro eNBs and CSG Home eNBs", 3GPP TSG RAN WG1 Meeting #62bis, R1-105551, Oct. 11-15, 2010.
LG Electronics, "Details of eICIC in Macro-Pico case", 3GPP TSG RAN WG1 Meeting 62bis, R1-105352, Oct. 11-15, 2010.
Ericsson, et al., "On Macro-Femto interference handling", 3GPP TSG RAN WG1 Meeting 62bis, R1-105337, Oct. 11-15, 2010.
Nokia Siemens Networks, Nokia Corporation; RRC Impact of eICIC; 3GPP TSG-RAN WG2 Meeting #71bis; R2-105467; Oct. 11-15, 2010; Xi'an, China.
Nokia Siemens Networks; On TDM eICIC Coordination for Macro+Pico Cases; 3GPP TSG RAN WG3 #69-BIS Meeting; R3-102817; Oct. 11-15, 2010; Xi'an, China.
RAN1; LS on time-domain extension of Rel 8/9 backhaul-based ICIC for Marco-Pico scenario; 3GPP TSG RAN WG2 Meeting #71bis; R2-105991; Oct. 11-15, 2010; Xi'an, China.
Huawei, Hisilicon; Analysis on TDM based RLM/RRM/CSI measurement impact; 3GPP TSG-RAN WG2 Meeting #71bis; R2-105600; Oct. 11-15, 2010; Xi'an, China.
RAN1, Way Forward on Time-Domain Extension of Rel 8/9 Backhaul-Based ICIC, 3GPP TSG-RAN WG1 Meeting #62bis, Xi'an, P.R. China, Oct. 11-15, 2010, pp. 1-4, R1-105779.
Huawei et al., Way Forward on Backhaul-Based eICIC, 3GPP TSG-RAN WG1 Meeting #62bis, Xian, China, Oct. 11-15, 2010, R1-105726.
Huawei et al., The Possible Restrictions on the Configuration of Almost Blank Subframes in Macro-Pico Deployments, 3GPP TSG RAN WG1 meeting #62bis, Xi'an, China, Oct. 11-15, 2010, R1-105150.
Ericsson et al., Details of Almost Blank Subframes, 3GPP TSG-RAN WG1 #62bis, Xi'an, China, Oct. 11-15, 2010, R1-105335.
Samsung, CSI Measurement Restriction for Macro-Pico Scenarios, 3GPP TSG RAN WG1 Meeting #63, Jacksonville, USA, Nov. 15-19, 2010, pp. 1-3, R1-106049.
Samsung, Considerations for ABSF Pattern Design, 3GPP TSG-RAN WG2 #72, Jacksonville, US, Nov. 15-19, 2010, R4-104163.

* cited by examiner

RESOURCE MANAGEMENT SYSTEM AND METHOD FOR INTER-CELL INTERFERENCE COORDINATION IN WIRELESS COMMUNICATION SYSTEM

PRIORITY

This application claims the benefit under 35 U.S.C. §119 (a) of a Korean patent application filed on Nov. 8, 2010 in the Korean Intellectual Property Office and assigned Serial No. 10-2010-0110616, the entire disclosure of which is hereby incorporated by reference.

BACKGROUND OF THE INVENTION

1. Field of the Invention

The present invention relates to a mobile communication system. More particularly, the present invention relates to a resource management system and method for inter-cell interference coordination and channel information feedback in a mobile communication system.

2. Description of the Related Art

Mobile communication systems have developed to provide subscribers with voice communication services on the move. With the advancements of various technologies, the mobile communications systems have been evolved to support high speed data communication services as well as the voice communication services. However, there is a need of more sophisticated mobile communication systems to mitigate resource shortages and meet the high-speed service requirements of the subscribers.

Long Term Evolution (LTE) is a next generation broadband communication technology developed by the 3rd Generation Partnership Project (3GPP) in order to meet such requirements. The LTE system is a technology for realizing high-speed packet-based communication at up to 100 Mbps in the downlink.

In order to fulfill the requirements for the LTE system, discussions are being held on various aspects, including a discussion on reducing the number of nodes located in a communication path by simplifying a configuration of the network, and another discussion on a scheme for maximally approximating wireless protocols to wireless channels.

Inter-Cell-Interference-Coordination (ICIC) is a technique introduced in LTE to reduce Inter-Cell Interference (ICI) by sharing information on the currently used data channel resource among the cells, thereby keeping the inter-cell interferences under control of an evolved Node B (eNB). In more detail, the eNB notifies neighbor eNBs of the information on the Resource Block (RB) resource assigned for transmission at relatively high transmission power and the RB resource on which the interference is greater than a predetermined level such that the neighbor eNBs adjust transmission power and perform scheduling decisions on their RB resources based on that information.

Meanwhile, the heterogeneous environment under discussion in LTE-Advanced (LTE-A) is the environment where a plurality pico cells operating with relatively low transmission power are distributed in a macro cell operating with relatively high transmission power. In such an environment, it is difficult to expect the ICIC of the related art to be efficient due to the high interference between base stations. There is therefore a need for an interference control technique working in time domain instead of the frequency domain. Enhanced-ICIC (eICIC) is a time domain interference control technique under discussion.

SUMMARY OF THE INVENTION

Aspects of the present invention are to address at least the above-mentioned problems and/or disadvantages and to provide at least the advantages described below. Accordingly, an aspect of the present invention is to provide a method and apparatus for determining resources for inter-cell interference coordination and channel information feedback in a wireless communication.

Another aspect of the present invention is to provide a method and apparatus for maximizing performance of a pico cell with time domain enhanced-Inter-Cell-Interference-Coordination (eICIC) through static and dynamic time resource allocation.

Another aspect of the present invention is to provide a resource management system and method that is capable of improving resource efficiency through User Equipment (UE) feedback control.

In accordance with an aspect of the present invention, a resource management method for interference coordination in a wireless communication system is provided. The method includes transmitting an Almost Blank Subframe (ABS) set from a first base station to a second base station, transmitting a reference resource configuration set for channel measurement and a Radio Link Monitor/Radio Resource Measurement (RLM/RRM) for radio resource measurement from the second base station to a terminal, and scheduling, at the second base station, the terminal in a subframe selected from the ABS set.

In accordance with another aspect of the present invention, a channel feedback method of a terminal is provided. The method includes receiving a reference resource configuration set for channel measurement from a base station, measuring channels in subframes indicated by the reference resource configuration set, and transmitting channel measurement values to the base station.

In accordance with still another aspect of the present invention, a resource management system is provided. The system includes a first base station for transmitting an ABS set, a second base station for transmitting a reference resource configuration set for channel measurement and a RLM/RRM for radio resource measurement from the second base station to a terminal and for scheduling the terminal in a subframe selected from the ABS set, and a terminal for measuring channels in subframes indicated by the reference resource configuration set and for transmitting channel measurement values to the second base station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 6 is a diagram illustrating ABS configuration according to a first exemplary embodiment of the present invention;

FIG. 10 is a diagram illustrating a principle of CSI restriction set configuration for use in a resource management method according to the second exemplary embodiment of the present invention;

FIG. 18 is a diagram illustrating a principle of ABS configuration for use in a resource management method according to the fifth exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
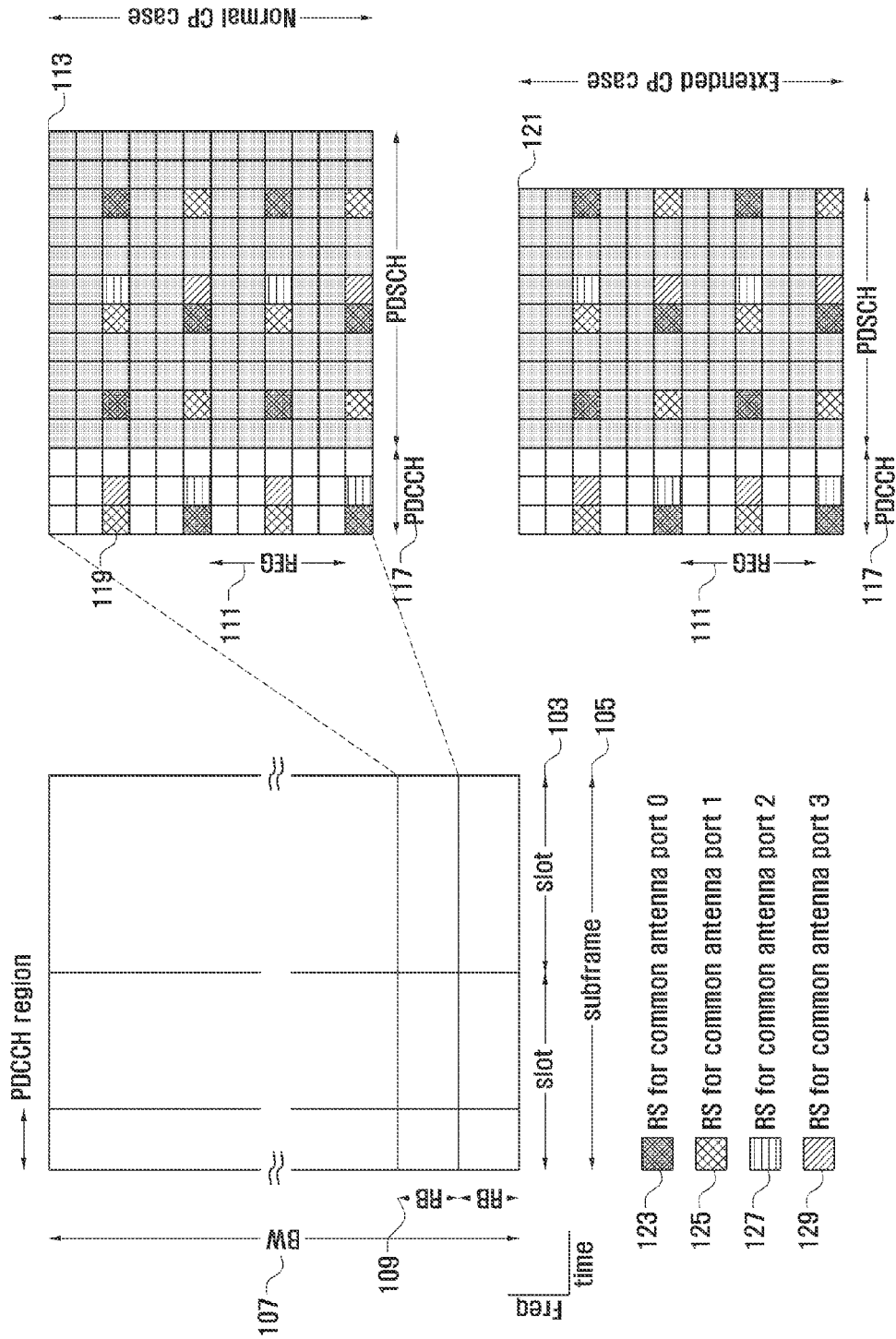
FIG. 1 is a diagram illustrating a format of a subframe for use in a Long Term Evolution (LTE) system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the description is directed to Long Term Evolution (LTE) and LTE-Advanced (LTE-A) systems, the present invention can be equally applied to other types of wireless communication systems in which a base station performs scheduling.

The LTE system adopts Orthogonal Frequency Division Multiplexing (OFDM) as its transmission scheme. OFDM is a technique for transmitting data using multiple carriers, i.e., a multi-carrier transmission technique. In more detail, the OFDM transmission scheme performs serial-to-parallel conversion and modulation on the input symbol stream so as to be transmitted on orthogonal multiple carriers, i.e., a plurality of subcarrier channels.

The origins of OFDM started in the late 1950's with Frequency Division Multiplexing (FDM), which was developed for military communications. OFDM using orthogonal overlapping multiple subcarriers has been developed in the 1970's, but was not in wide spread used due to the difficulty of implementing orthogonal modulations between multiple carriers. With the introduction of the idea of using a Discrete Fourier Transform (DFT) for implementation of the generation and reception of OFDM signals, by Weinstein, in 1971, OFDM technology has since developed rapidly. Additionally, the introduction of a guard interval at the start of each symbol and the use of a Cyclic Prefix (CP) addresses the negative effects caused by multipath signals and a delay spread.

Owing to such technical advances, the OFDM technology is applied in various digital communications fields such as Digital Audio Broadcasting (DAB), Digital Video Broadcasting (DVB), Wireless Local Area Network (WLAN), and Wireless Asynchronous Transfer Mode (WATM). That is, the implementation of OFDM could be accomplished by reducing implementation complexity with the introduction of various digital signal processing technologies such as Fast Fourier Transform (FFT) and Inverse Fast Fourier Transform (IFFT).

OFDM is similar to Frequency Division Multiplexing (FDM) but much more spectrally efficient and thereby achieves high speed data transmission by overlapping multiple subcarriers orthogonally. Due to the spectral efficiency and robustness to the multipath fading, OFDM has been considered as a prominent solution for broadband data communication systems. Other advantages of OFDM are the control the Inter-symbol Interference (ISI) using the guard interval, the reduction of the complexity of an equalizer in view of hardware as well as spectral efficiency, and the robustness to the frequency selective fading and multipath fading. OFDM is also robust to impulse noise so as to be employed in various communication systems.

In wireless communications, high-speed, high-quality data services are generally hindered by the channel environments. In wireless communications, the channel environments suffer from frequent changes not only due to Additive White Gaussian Noise (AWGN) but also power variation of received signals, caused by a fading phenomenon, shadowing, a Doppler effect brought by movement of a terminal and a frequent change in a velocity of the terminal, interference by other users or multipath signals, etc. Therefore, in order to support high-speed, high-quality data services in wireless communication, there is a need to efficiently address the above channel quality degradation factors.

In OFDM, modulation signals are located in the two-dimensional time-frequency resources. Resources on the time domain are divided into different OFDM symbols, and are orthogonal with each other. Resources on the frequency domain are divided into different tones, and are also orthogonal with each other. That is, the OFDM scheme defines one minimum unit resource by designating a particular OFDM symbol on the time domain and a particular tone on the frequency domain, and the unit resource is referred to as a Resource Element (RE). Since different REs are orthogonal with each other, signals transmitted on different REs can be received without causing interference to each other.

A physical channel is a channel defined on the physical layer for transmitting modulation symbols obtained by modulating one or more coded bit sequences. In an Orthogonal Frequency Division Multiple Access (OFDMA) system, a plurality of physical channels can be transmitted depending on the usage of the information sequence or receiver. The transmitter and receiver negotiate the RE on which a physical channel is transmitted, and this process is referred to as mapping.

The LTE system is a communication system which uses OFDM in the downlink and Single Carrier-Frequency Division Multiple Access (SC-FDMA) in the uplink. The LTE-A system is an advanced LTE system supporting wider bandwidth by aggregating two or more LTE component carriers.

FIG. 1 is a diagram illustrating a format of a subframe for use in an LTE system according to an exemplary embodiment of the present invention. Here, the subframe is compatible with the LTE-A system.

Referring to FIG. 1, a given LTE transmission bandwidth 107 is segmented into a plurality of Resource Blocks (RBs). A subframe 105 has a duration of 1 ms and consists of two slots 103. Each of RBs 109 is generated from 12 subcarriers in the frequency domain and 14 OFDM symbols and is a basic unit of resource allocation. Alternatively, RBs may include 12 OFDM symbols in the time domain. The RB consisting of 14 OFDM symbols is transmitted in a normal Cyclic Prefix (CP) subframe structure 113 while the RB consisting of 12 OFDM symbols is transmitted in an extended CP subframe structure 121.

The Reference Signal (RS) 119 is the signal agreed for use in channel estimation between a User Equipment (UE) and an evolved Node B (eNB) that is transmitted through a corresponding antenna port, e.g., RS 123 for antenna port 0, RS 125 for antenna port 1, RS 127 for antenna port 2, and RS 129 for antenna port 3.

Although the absolute position of an RE designated for the RS in the frequency domain varies depending on the cell, the interval between the RSs is maintained. That is, the RSs for the same antenna port are transmitted while maintaining the interval by as many as 6 REs. The reason why the absolute position of the RS varies is to avoid collision between RSs in different cells. The number of RSs can be set differently per antenna port. In more detail, the antenna ports 0 and 1 transmit 8 RSs in one RB or subframe, while the antenna ports 2 and 3 transmit 4 RSs in one RB or subframe. Accordingly, when four antennas are used, the channel estimation using the antenna ports 2 and 3 is inferior to the channel estimation using the antenna ports 0 and 1.

The RSs are categorized into Common RS (CRS) and Dedicated RS (DRS). CRS is cell-specific such that all the UEs can receive the CRS within a cell. DRS is UE-specific such that the UE allocated a specific resource can receive the DRS. DRS is useless for other UEs but is useful for the UE scheduled on the corresponding resource.

The control channel signal is transmitted at the beginning of the subframe in the time domain. In FIG. 1, reference number 117 indicates the region in which the control channel signal is transmitted. The control channel signal can be transmitted across "L" OFDM symbols at the beginning of the subframe. "L" can be 1, 2, or 3. FIG. 1 is depicted to describe the case when "L" is 3.

In a case where one OFDM symbol is enough for transmitting the control channel, the first OFDM symbol of the subframe is assigned for the control channel ("L"=1). In this case, the remaining 13 OFDM symbols are used for data transmission. The value "L" is used as the basic information for demapping at the receiver. Accordingly, if "L" not received, the UE cannot recover the control channel.

In Multimedia Broadcast over a Single Frequency Network (MBSFN), the value of "L" is fixed to 2. Here, the MBSFN is the channel configured for transmitting broadcast information. However, the MBSFN can be used for various purposes such as relay backhaul transmission in an LTE-A system. If the corresponding subframe is indicated as a broadcast subframe, the LTE UE recognizes the broadcast subframe by referencing the control channel region and stops receiving the data region of the subframe. However, the LTE-A UE can receive the data region for another purpose.

The reason why the control channel signal is arranged at the beginning of the subframe is to allow a UE to check the control channel signal in advance to determine whether the data channel signal following the control channel signal is destined for itself. That is, the UE determines whether to receive the data channel signal based on the control channel signal. If it is determined that there is no data channel signal destined to the UE, there is no need for the UE to receive the data channel signal. As a consequence, the UE can avoid the unnecessary power consumption for receiving the data channel signal. Also, since the control channel is received quickly as compared to the data channel, it is possible to reduce scheduling delay.

The downlink control channel defined in LTE is transmitted in a unit of a Resource Element Group (REG) 111. The LTE standard specifies three downlink control channels, namely a Physical Control Format Indicator CHannel (PCFICH), a Physical Hybrid Automatic Repeat reQuest (HARQ) Indicator CHannel (PHICH), and a Packet Data Control Channel (PDCCH).

The PCFICH is the physical channel for transmitting the Control Channel Format Indicator (CCFI) to the UE. CCFI is 2-bits long and indicates the number of symbols occupying the control region in subframe "L". Since a terminal can recognize the number of symbols of the control region based on the CCFI, the PCFICH must be the first channel to be received in a subframe except when the downlink resource is allocated persistently. Since a UE does not know the value of "L" before receiving the PCFICH, the PCFICH is always mapped to the first OFDM symbol of each subframe. The PCFICH is transmitted in 4 resource groups formed by equally separating 16 subcarriers in the frequency domain.

The PHICH is the physical channel for transmitting downlink ACKnowledgements (ACKs)/Non-ACKnowledgements (NACKs). PHICH is received by the UE which is performing uplink data transmission. Accordingly, the number of PHICHs is in proportion to the number of UEs performing uplink transmissions. PHICH is transmitted in the first OFDM symbol (LPHICH=1) or across three OFDM symbols (LPHICH=3) of the control region. The PHICH configuration information (i.e., number of channels, LPHICH) is broadcast through the Primary Broadcast Channel (PBCH) such that all of the UEs acquire the information at their initial connection to the cell. Also, PHICH is transmitted at a predetermined position per cell like the PCFICH such that the UEs can acquire the PHICH configuration information by receiving the PBCH when the UE connects to the cell regardless of other control channel information.

PDCCH 117 is a physical channel for transmitting data channel allocation information or power control information. The PDCCH can be transmitted at different channel coding rates according to the channel condition of the target UE. Since Quadrature Phase Shift Keying (QPSK) is fixedly used for PDCCH transmission, the amount of resources used for transmitting PDCCH 117 is changed in order to change the channel coding rate. When the channel condition of the terminal is good, a high channel coding rate is used to conserve resources. In contrast, when the channel condition of the terminal is bad, a low channel coding rate is used to increase reception probability at the UE even at the expense of a large amount of resources. The amount of resources consumed by each PDCCH is determined in a unit of a Control Channel Element (CCE). Each CCE is composed of 5 REGs 111. In order to secure diversity, the REGs of the PDCCH are arranged in the control region after interleaving has been performed.

In order to multiplex several ACK/NACK signals, a Code Domain Multiplexing (CDM) technique is applied for PHICH. In a single REG, 8 PHICH signals are multiplexed into 4 real number parts and 4 imaginary number parts by means of the CDM technique and are repeated by as many as NPHICH so as to be distributed in the frequency domain to obtain frequency diversity gain. By using a NPHICH REG, it is possible to form 8 or less PHICH signals. In order to form more than 8 PHICH signals, another NPHICH REG is used.

After assigning resources for PCFICH and PHICH, the eNB determines the value of "L", maps the physical channels to the REG of the assigned control region 117 based on the value of "L". Next, the eNB performs interleaving to obtain frequency diversity gain. The interleaving is performed on the total REGs of the subframe determined by the value of "L" in a unit of a REG in the control region. The output of the interleaver in the control region is capable of preventing the Inter-Cell Interference (ICI) caused by using the same interleaver for the cells and is capable of obtaining the diversity gain by distributing the REGs of the control region across one or more symbols. Also, the REGs forming the same control channel are distributed uniformly across the symbols per control channel.

Figure 2:
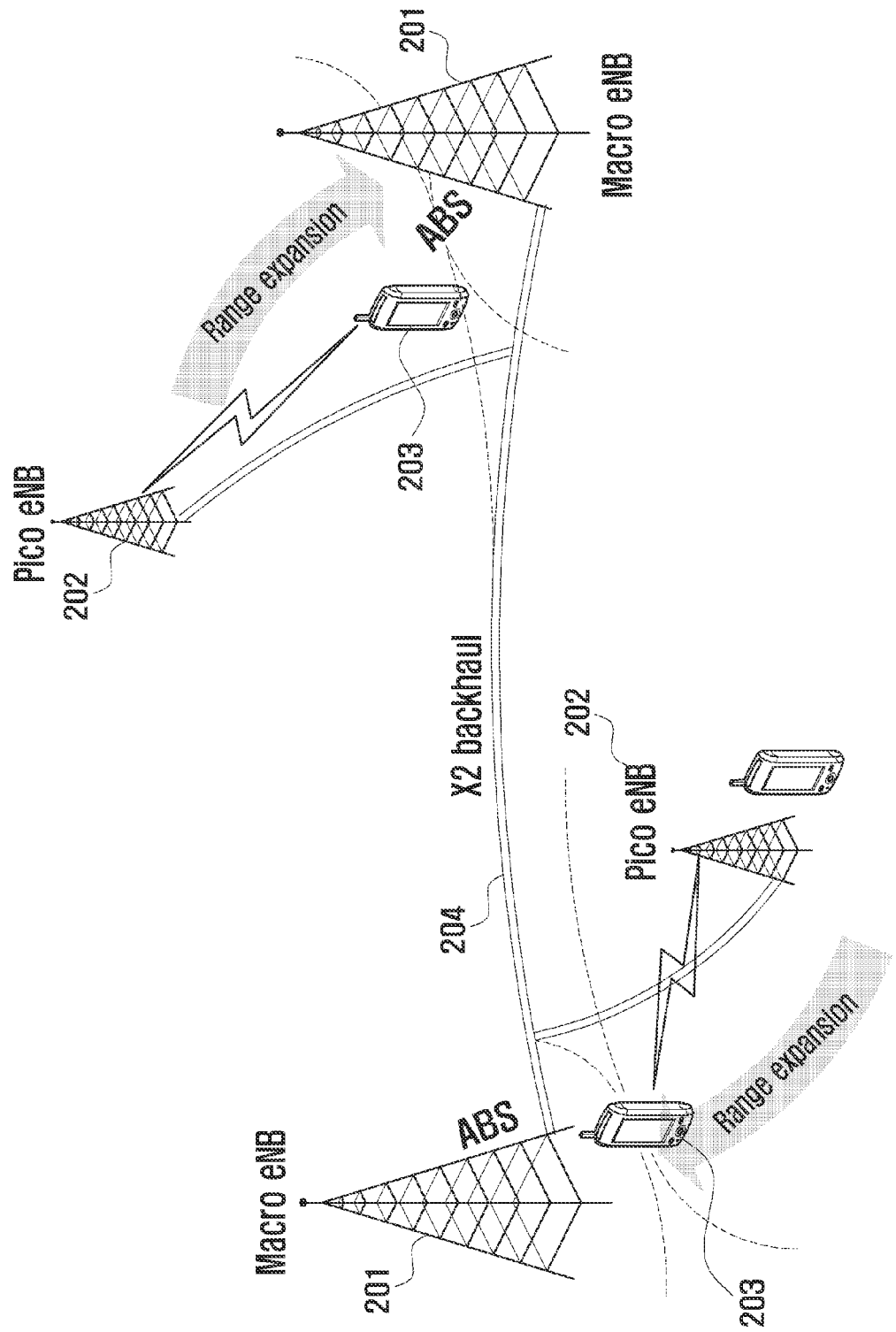
FIG. 2 is a diagram illustrating an architecture of a heterogeneous cellular communication system according to an exemplary embodiment of the present invention.

FIG. 2 is a diagram illustrating an architecture of a heterogeneous cellular communication system according to an exemplary embodiment of the present invention.

Referring to FIG. 2, the heterogeneous cellular system includes multiple cells that are different in size and/or type that are coexisting in an area overalppingly, and the following description is directed to a case where a plurality of pico cells are deployed in a macro cell.

Inter-Cell-Interference-Coordination (ICIC) is effective to mitigate interference between macro eBNs 201 that exchange information on the resource utilization. In LTE, ICIC is a technique for restricting transmission power on a specific frequency resource. That is, the ICIC technique of LTE is designed under the assumption of an all-macro cell environment such that the maximum transmission power on a specific resource is limited by a plurality of cells equal to each other in transmission power.

The information of each eNB is transmitted to a neighbor eNB physically connected through an X2 backhaul network 204. An LTE-A system is designed based on the concept of heterogeneous networks for improving transmission capacity at a specific area by deploying tiny cells consuming relatively low transmission power in the LTE cellular environment. The radius of the tiny cell is shrunk significantly due to its very low transmission power as compared to that of the macro cell. With the reduced cell size, the number of UEs that can be served by the cell also decreases. As a consequence, the performance gain expected in the heterogeneous cell structure is restricted. That is, although all the eBNs support the same number of UEs to maximize the frequency utilization efficiency in the same band, the large difference in cell size limits the number of UEs that can be served in the small cell, resulting in a degradation of system performance.

In order to maximize the system performance, the pico cell 202 operates at low transmission power level to accommodate as many UEs as possible. In order for the pico cell 202 to accommodate as many UEs as possible, the size of the cell is increased. For this purpose, the UE should be designed so as to select a pico cell of which a received signal is lower than that of the macro cell as a target cell for attachment at a location having the same transmission power for the pico and macro cells.

In LTE, the UE can connect to the eNB transmitting for a received power level requested by the UE, and this is referred to as cell range expansion technology. In this case, the UE 203 is located physically closer to the macro eNB 201 than to the pico cell eNB 202. In a case where the UE 203 is transmitting a control channel and a data channel, it is likely to experience strong interference from the macro cell, resulting in communication failure with the pico cell. The eNB can protect the control channel transmission of the UE connected to the pico cell by muting transmission on a specific resource. This technique is referred to as an Almost Blank Subframe (ABS).

Figure 3:
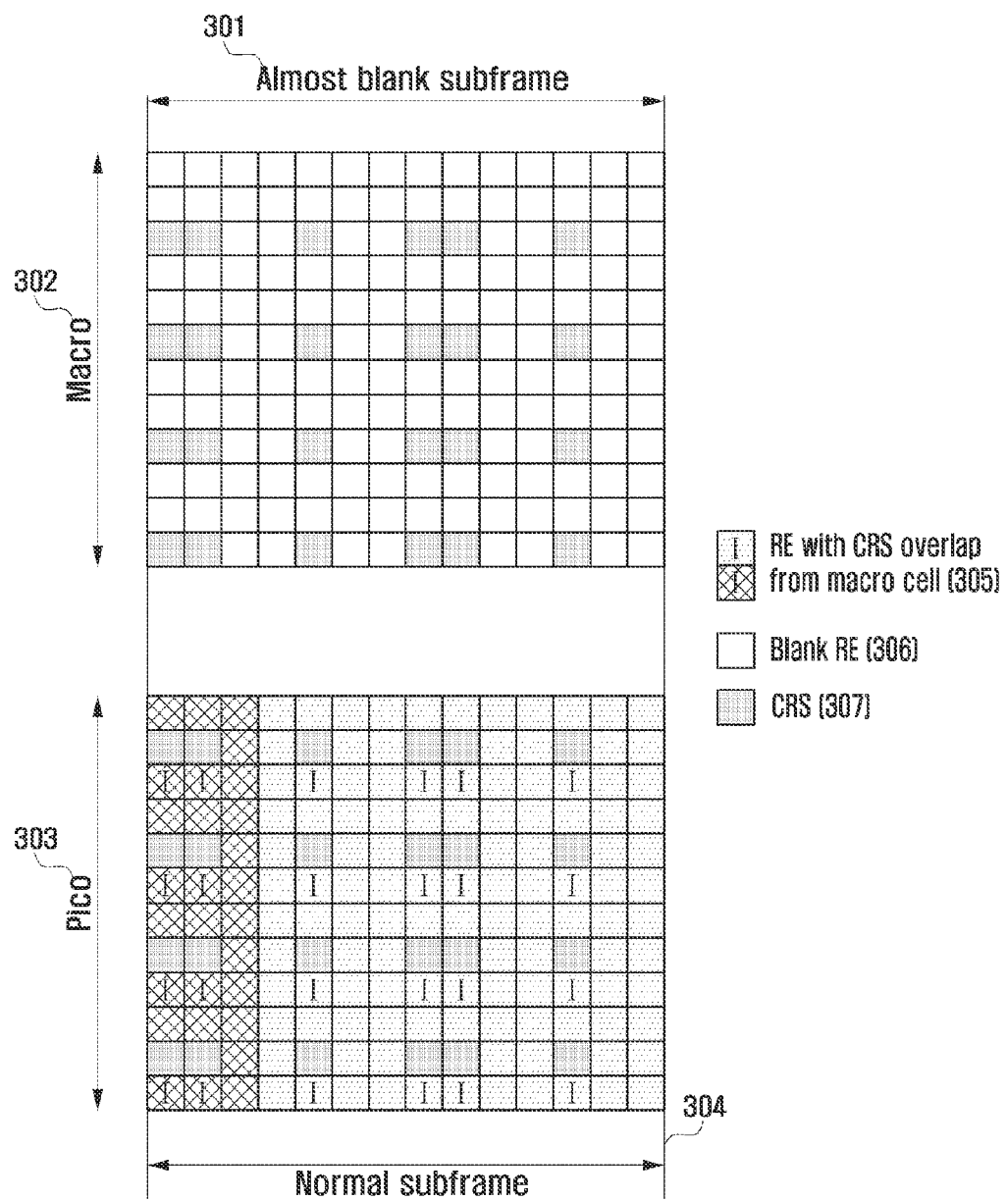
FIG. 3 is a diagram illustrating a format of an Almost Blank Subframe (ABS) according to an exemplary embodiment of the present invention.

FIG. 3 is a diagram illustrating a format of an ABS according to an exemplary embodiment of the present invention. FIG. 3 shows the structure of an ABS on the frequency and time axes.

Referring to FIG. 3, most of the REs constituting the ABS 301 are blank REs 306 carrying on signals. However, the CRSs 307 and the signals carrying the system information can be transmitted in the ABS 301. The UE attached to a macro cell 302 measures channel using the CRSs 307 transmitted by the eNB on the frequency and time resources and feeds back the measurement result. Accordingly, when no CRS 307 is transmitted, the UE cannot connect to the macro cell 302 any longer.

The CRS 307 of the macro cell is the only influence to the UE attached to the pico cell 303. The CRS 307 of the ABS 301 of the macro cell 302 may overlap 305 with corresponding REs in a normal subframe 304 of the pico cell 303. The macro eNB controlling the macro cell 302 configures some of the subframes as an ABS and notifies the pico eNB controlling the pico cell 303 of the ABS. Here, it is important to select the subframe as an ABS.

Figure 4:
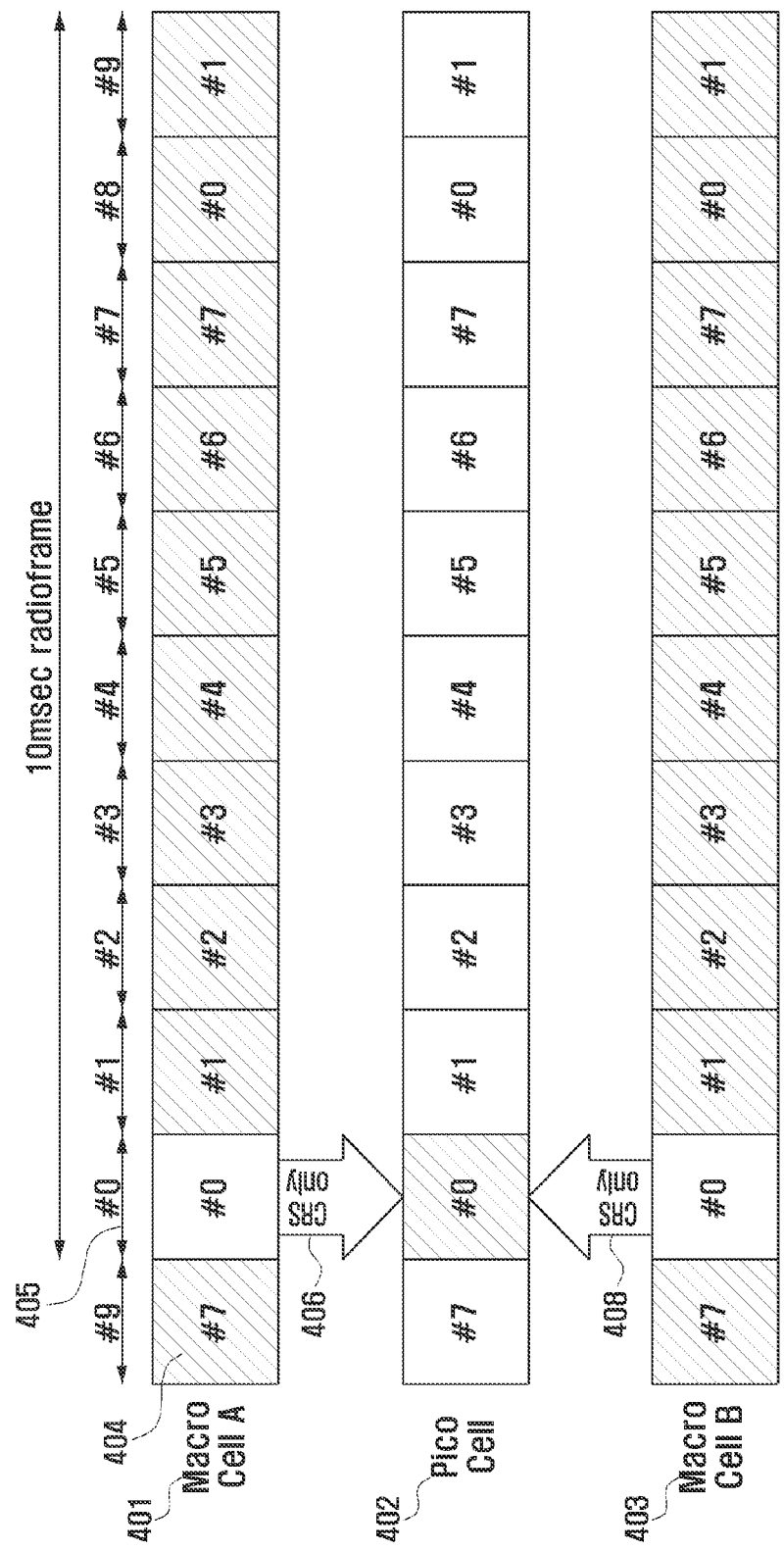
FIG. 4 is a diagram illustrating a principle of configuring an ABS set in a resource management method according to an exemplary embodiment of the present invention.

FIG. 4 is a diagram illustrating a principle of configuring an ABS set in a resource management method according to an exemplary embodiment of the present invention. FIG. 4 shows the relationship between macro and pico cells. Referring to FIG. 4, macro cell A 401 and macro cell B 403 configure the subframe 0 405 as an ABS.

The reference signals transmitted by the macro cell A 401 and macro cell B 403 interfere with the signal of the pico cell 402 in the subframe 0 as denoted by reference numbers 406 and 408. At this time, the pico cell 402 schedules all the attached UEs in all of the subframes, except for the UE located at the cell boundary region in the subframe 0. For this purpose, the macro cell configures a specific subframe as an ABS.

The subframe selection is made such that the UE can receive the signal transmitted in a specific subframe without influence to a HARQ process. The subframe selection also aims to avoid influence to the receipt of paging channel and system information that influence the UE performance. There is therefore a need of an ABS configuration method without causing system information change, i.e., an ABS configuration change, other information change, and paging channel change.

Channel State Information (CSI) feedback can be performed using all of the resources. In a case of using ABS, the eNB notifies the UE of the resource used for feedback. The eNB can determine if interference occurred on the resource used for the current feedback and performs scheduling while avoiding the interference in the subframe. The use of incorrect feedback information causes constant errors, resulting in communication failure of all of the UEs. Accordingly, the resource configuration for CSI feedback relates to the ABS resource configuration.

In a case where the macro eNB changes the ABS configuration, the UEs connected to the pico eNB are instructed to change resource configuration. The resource configuration change process may cause problems such as the errors due to the time offset and the system overhead. Accordingly, if a resource set is configured to negate a UE's resource configuration change caused by the change of an ABS, it is possible to improve system management efficiency. Exemplary embodiments of the present invention propose an ABS resource configuration method and CSI resource restriction configuration and management method to address the above-described problems.

Figure 5:
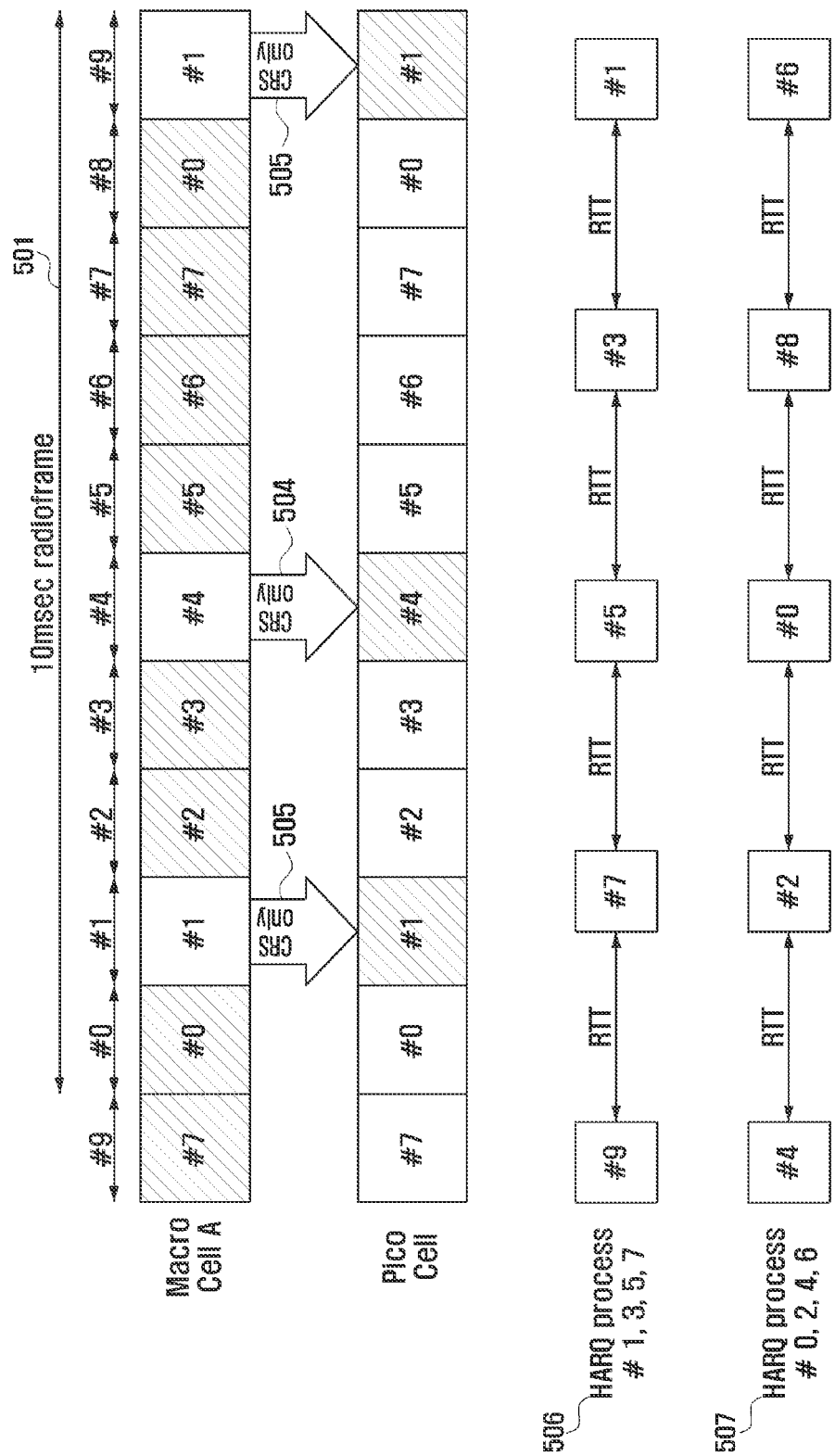
FIG. 5 is a diagram illustrating a principle of configuring an ABS set in a resource management method according to a first exemplary embodiment of the present invention.

FIG. 5 is a diagram illustrating a principle of configuring an ABS set in a resource management method according to a first exemplary embodiment of the present invention.

According to the first exemplary embodiment of the present invention, the ABS resource is configured by the macro cell as follows. A rule for determining an ABS pattern is proposed such that the resource used in the pattern is configured as the sum of the time resource determined according to the cycle of Round Trip Time (RTT). In more detail, referring to FIG. 5, the ABS pattern can be configured with the resource combining at least one 10 msec subframe 501 index 4 504 and/or index 9 505 subframe. In an LTE Frequency Division Duplex (FDD) system, RTT is set to 8 msec but can be set to another value in other exemplary embodiments of the present invention. The reason why the pattern is determined in the aforementioned manner is because two important items of information are transmitted in the 4th and 9th subframes. The two important items of information are the paging signal and system information change-related information.

In order to receive a call, a UE continues monitoring a paging signal. If the system information is changed, the eNB transmits the changed system information on the channel carrying the paging signal. The system information includes the information on the ABS subframe. When the ABS is used in the state where it is not possible to update the system information continuously, the UE cannot transmit/receive data continuously. However, it is not possible to configure all the 4th and 9th subframes in all the radio frames as an ABS due to a HARQ process, and the ABS configuration is limited to some extent.

Since the LTE system supports up to 8 HARQ processes for a UE, 1 to 7 HARQ processes can be selected according to the principle proposed in the first exemplary embodiment. That is, the 1st, 3rd, 5th, and 7th HARQ processes, as denoted by reference number 506, in the subframe 1 and the 0th, 2nd, 4th and 6th HARQ processes, as denoted by reference number 507 are selected. In a case where more than 1 HARQ process is selected, less HARQ processes are included in an ABS. For example, it should be configured that the subframe 4 is selected for the case where one HARQ process is determined in an ABS pattern and the subframes 4 and 1 are selected for the case where two HARQ processes are selected. This is referred to as a nested structured, and such a structure is maintained to change the corresponding pattern without immediate notification to the UE.

Although it is possible to receive the ABS pattern directly, the UE also can receive a Radio Link Monitor/Radio Resource Measurement (RLM/RRM) pattern. The RLM/RRM pattern can be configured as a subset of the ABS pattern. In a case where the RLM/RRM pattern is configured as a subset of the ABS pattern, the eNB can increase the number of ABSs without notifying the UE of the ABS pattern. However, when decreasing the number of ABSs, the eNB notifies the UE of a new RLM/RRM pattern.

The reason why the RLM/RRM pattern is a subset of the ABS pattern is because the UE should measure its signal in the part having no interference in order to determine that the connection to a pico cell is not disconnected in the area where the macro cell interference is high. The nested structure is used to configure the ABS for multiple cells. Even though the adjacent macro cells use a different ABS pattern, it is possible to maintain the ABS pattern commonly used by all of the macro cells with the nested structure.

Figure 6:
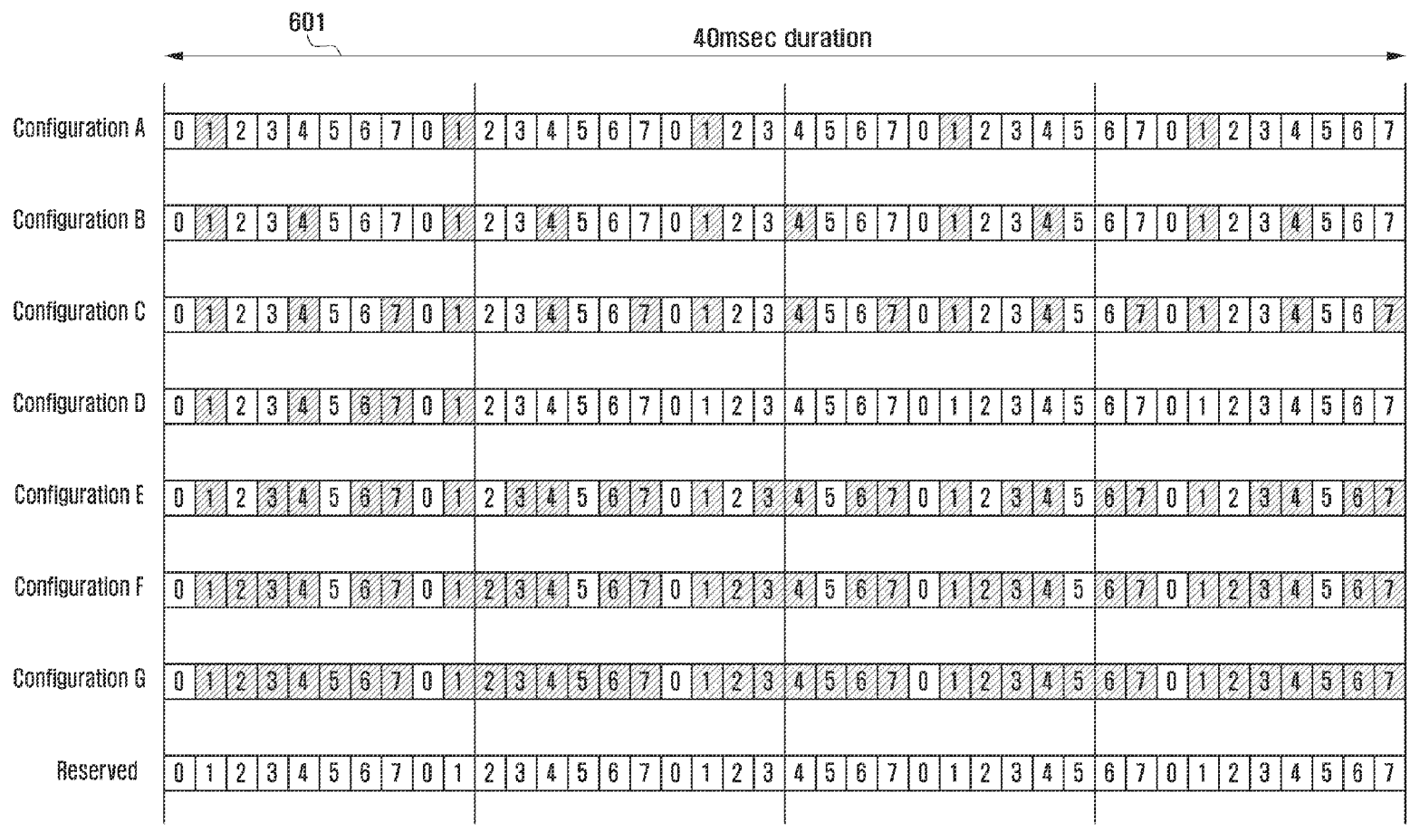

FIG. 6 is a diagram illustrating an ABS configuration according to the first exemplary embodiment of the present invention. Although the ABS configuration depicted in FIG. 6 is designed according to the rule proposed in exemplary embodiments of the present invention, a plurality of other patterns fulfilling the rule of the first exemplary embodiment can exist.

Referring to FIG. 6, the ABS pattern is configured in a layered structure including subframe 1 and 9 and an ABS set according to a number of HARQ processes applied to the ABS with 40 msec 601 as proposed in the first exemplary embodiment.

Figure 7:
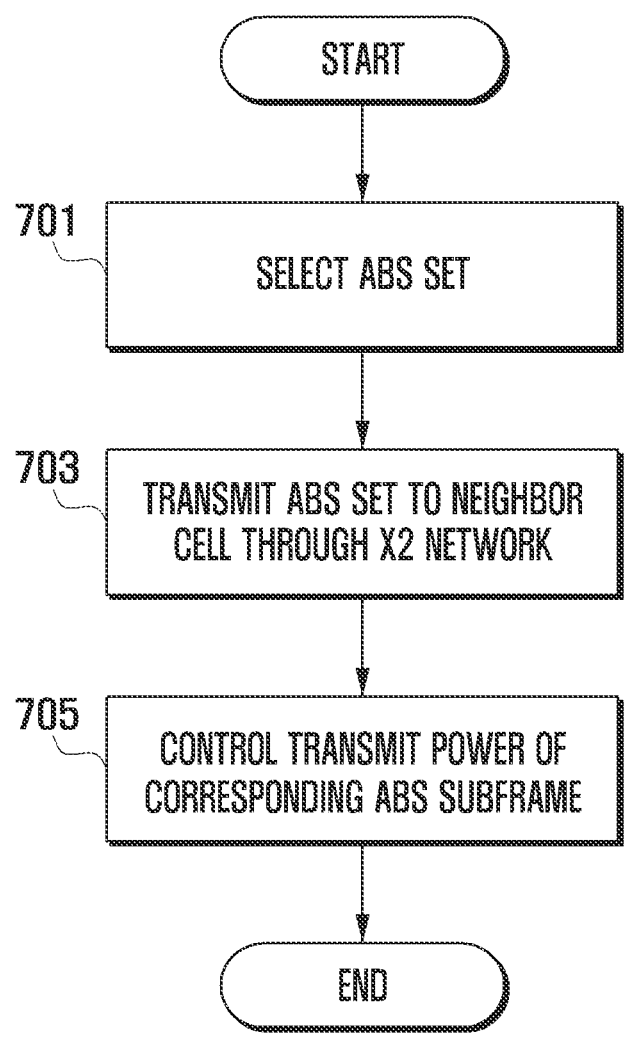
FIG. 7 shows a procedure for a macro evolved Node B (eNB) to determine an ABS pattern and transmit ABS pattern information to a neighbor eNB according to an exemplary embodiment of the present invention.

FIG. 7 is a flowchart illustrating a procedure for transmitting ABS configuration information according to the first exemplary embodiment of the present invention. FIG. 7 shows a procedure for a macro eNB to determine an ABS pattern and transmit ABS pattern information to the neighbor eNB.

Referring to FIG. 7, the macro eNB selects an ABS subframe from an ABS set configured according to a number of HARQ processes in step 701. Next, the macro eNB transmits the ABS pattern information of the selected ABS subframe to neighbor eNBs through an X2 network in step 703. Finally, the macro eNB determines the transmission power for transmitting only the reference signal in the corresponding ABS subframe in step 705.

Figure 8:
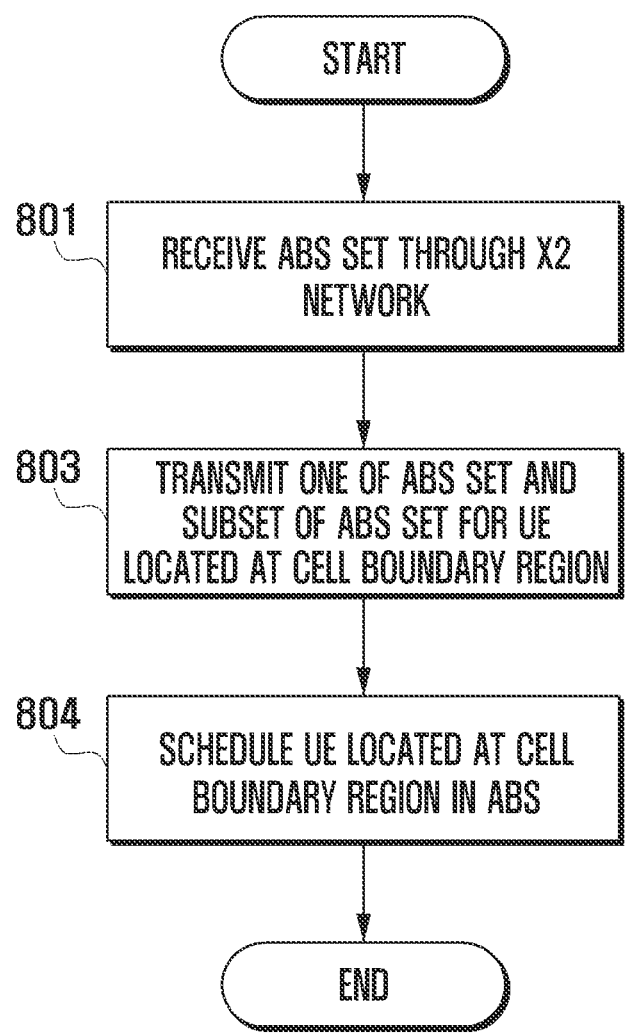
FIG. 8 is a flowchart illustrating a procedure for receiving ABS configuration information according to a first exemplary embodiment of the present invention.

FIG. 8 is a flowchart illustrating a procedure for receiving an ABS configuration information according to the first exemplary embodiment of the present invention. FIG. 8 shows a procedure for a pico eNB to receive the ABS pattern transmitted by the macro eNB.

Referring to FIG. 8, the pico eNB receives the ABS pattern information transmitted by the macro eNB through an X2 network in step 801. Next, the pico eNB determines the ABS subframe based on the ABS pattern information. The pico eNB regards the ABS subframe as a subframe having no interference from the macro eNB. Next, the pico eNB transmits an ABS set or a subset of the ABS set to the UE located at the cell boundary region in step 803. At this time, the reason why the pico eNB transmits the subset of the ABS set is for dynamic adaptation to the ABS change. Finally, the pico eNB schedules the UE located at an extended cell region or cell boundary region in the determined subframe in step 804.

Figure 9:
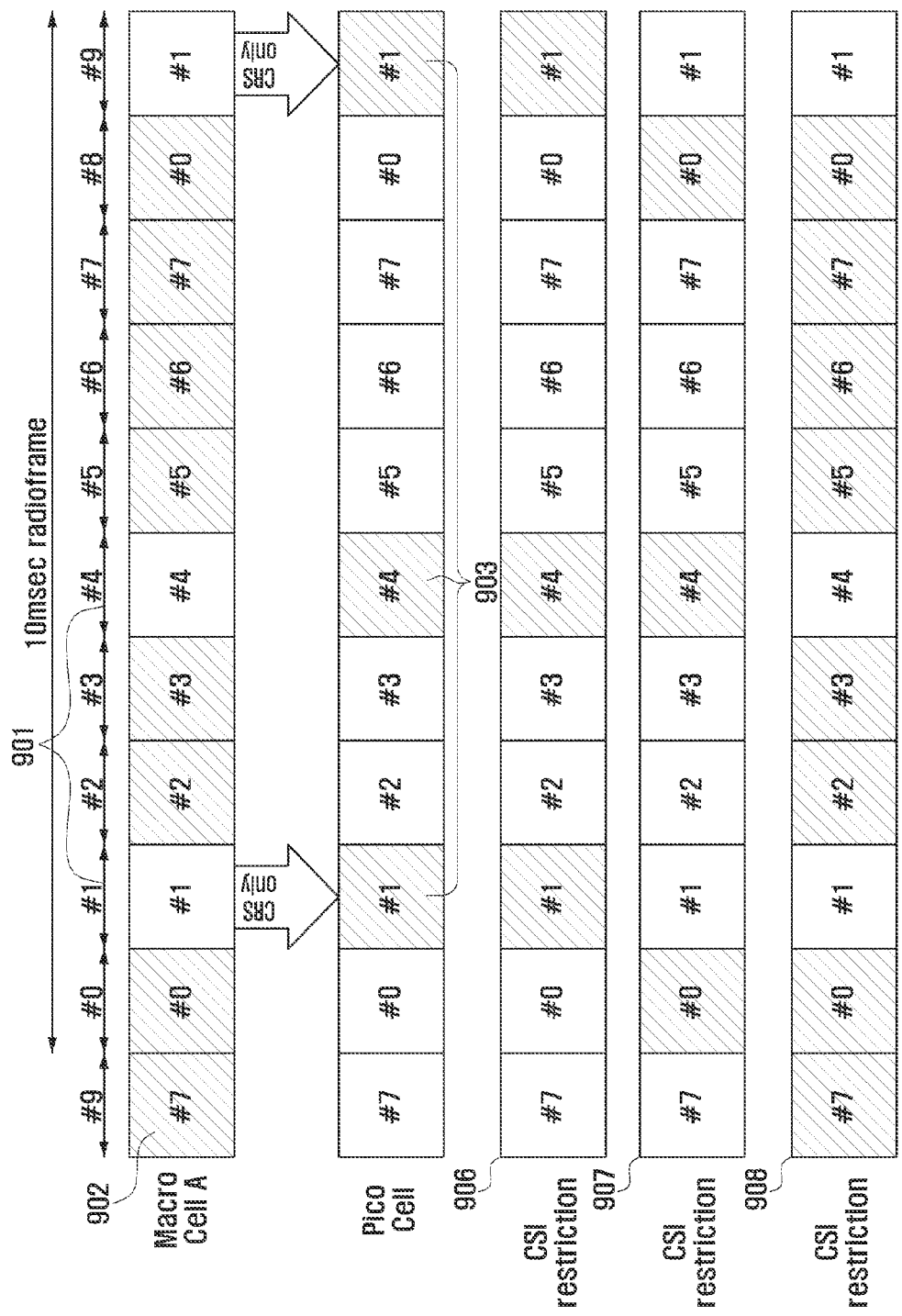
FIG. 9 is a diagram illustrating a principle of configuring a Channel State Information (CSI) restriction set in a resource management method according to a second exemplary embodiment of the present invention.

FIG. 9 is a diagram illustrating a principle of configuring a CSI restriction set in the resource management method according to a second exemplary embodiment of the present invention. FIG. 9 shows how to configure the pattern of a reference signal for use in a channel measurement at the UE according to the second exemplary embodiment of the present invention.

The CSI resource restriction set configuration is performed as follows. The ABS pattern shared among the cells is determined in the form of shift pattern or orthogonal pattern. The ABS pattern determined in the form of the shift pattern or the orthogonal pattern is for scheduling a UE in a non-ABS region, and the corresponding UE measures a channel using a pattern determined depending on its location. Referring to FIG. 9, among the subframes 902 of the macro eNB, subframe 1 and subframe 4 are configured as ABSs 901. Accordingly, the pico eNB schedules the UE located at the cell boundary region in the subframes denoted by reference number 903. The corresponding UE is restricted in the channel measurement resources by the pico cell as denoted by reference number 906.

However, the UE located at the center of the pico cell under the control of the pico eNB can perform channel measurement in the form of shift pattern of the CSI restriction pattern 906 as denoted by reference number 907 or in the form of orthogonal pattern as denoted by reference number 908.

In a case where the channel measurement resource allocated to the UE is configured as denoted by reference number 908, the pico eNB changes the CSI restriction resource of the UE according to the change of the ABS pattern. However, in a case where the channel measurement resource allocated to the UE is configured as denoted by reference number 907, the pico eNB can change some of the subframe without additional signaling to the UE according to the nested structure of the first exemplary embodiment.

The method proposed in the second exemplary embodiment is a simplified method for forming a pattern indicating two different subframes. That is, the CSI restriction resource configuration method is to configure such that one is identical with the ABS pattern while the other is not overlapped with the ABS pattern. Accordingly, all of the UEs can receive the CSI restriction set. The UE performs channel measurement on the resource corresponding to the restriction set. At this time the corresponding restriction set is configured with the entire ABS resource, or some or the entirety of the non-ABS resource.

The UE located at the cell boundary region of a pico cell is close to the macro cell such that, in order to avoid strong interference from the macro cell, the pico eNB schedules the UE in the ABS. For this purpose, the UE located at the pico cell boundary region has to perform the channel measurement for ABS duration, and this is configured using the pattern overlapped with ABS in the entire CSI restriction set. Whereas, the UE located at the center of the pico cell can be scheduled in both the ABS and non-ABS so as to perform channel measurement in the set allocated to be orthogonal with ABS pattern or by shifting the ABS pattern.

Figure 10:
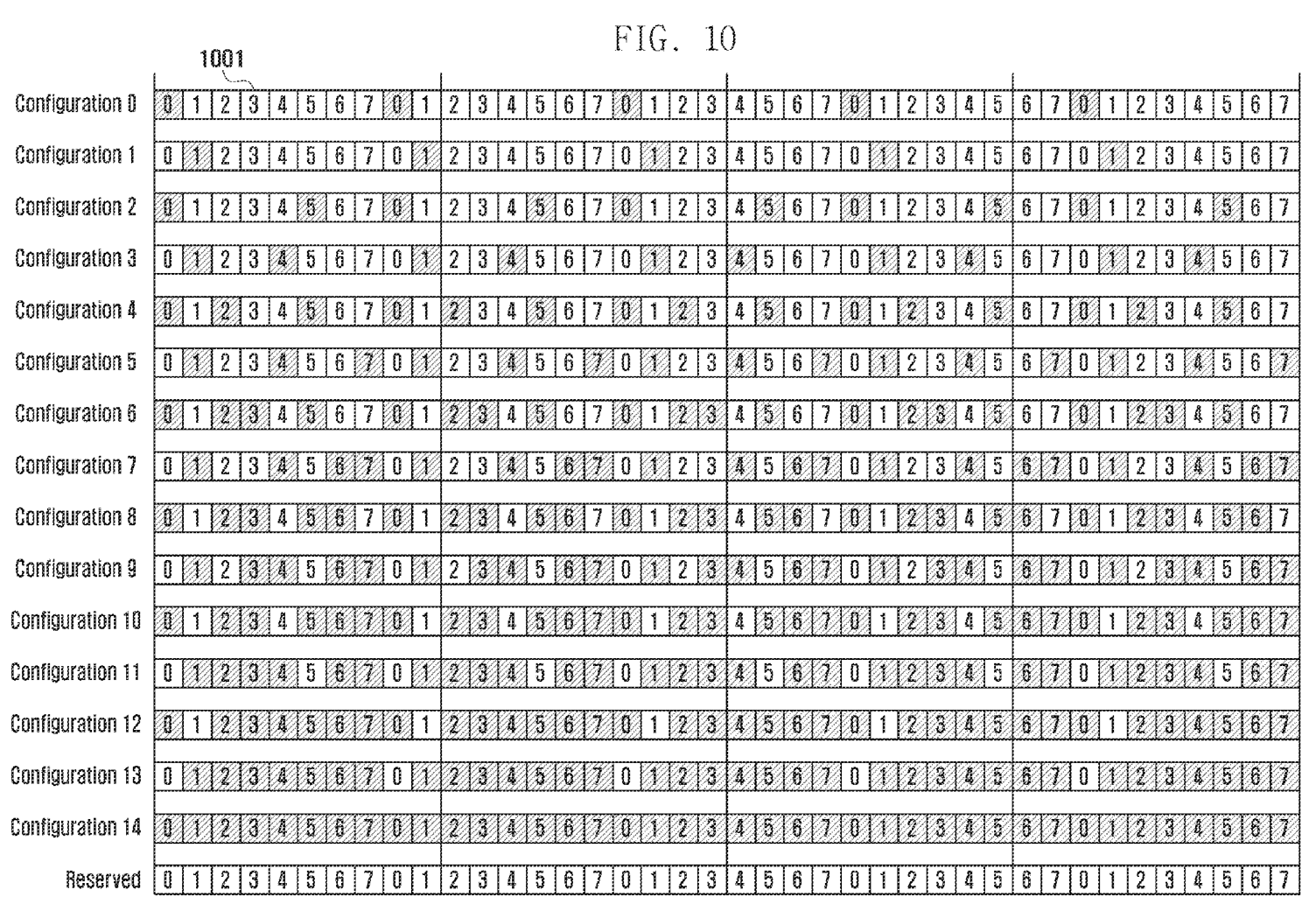

FIG. 10 is a diagram illustrating a principle of CSI restriction set configuration for use in a resource management method according to the second exemplary embodiment of the present invention. Although the CSI restriction set is configured according to the rule proposed in the exemplary embodiments of the present invention, a plurality of pattern sets fulfilling the rule of the second exemplary embodiment can exist. Referring to FIG. 10, configuration 0 denoted by reference number 1001 is a pattern obtained by shifting configuration 1 used in an ABS pattern and is orthogonal with configuration 13 used in an ABS pattern.

Figure 11:
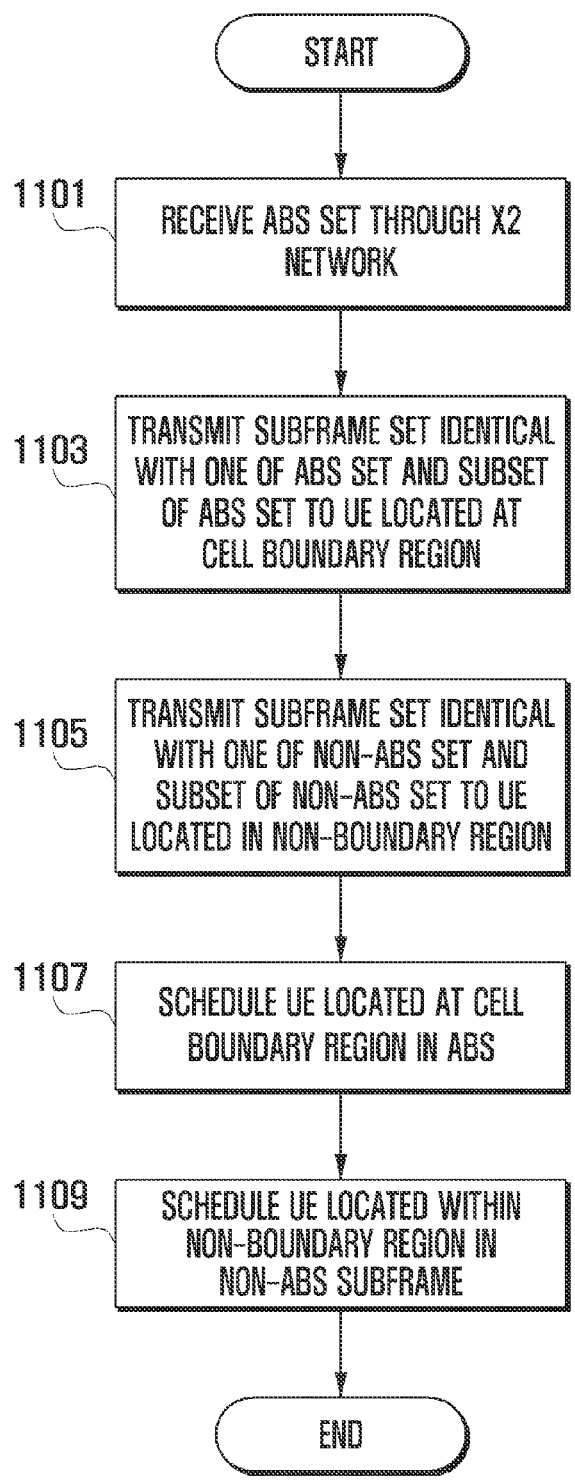
FIG. 11 is a flowchart illustrating a pico eNB procedure in a resource management method according to the second exemplary embodiment of the present invention.

FIG. 11 is a flowchart illustrating a pico eNB procedure in a resource management method according to the second exemplary embodiment of the present invention.

Referring to FIG. 11, the pico eNB receives an ABS pattern from an adjacent macro eNB through an X2 network in step 1101. The pico eNB transmits one of the CSI restriction sets configured according to the second exemplary embodiment of the present invention to each UE through Radio Resource Control (RRC) signaling.

That is, the pico eNB transmits the set identical with one of the ABS set and a subset of the ABS set to the UEs located at the cell boundary region in step 1103. Next, the pico eNB transmits the set identical with one of a non-ABS set and a subset of the non-ABS set to the UEs located within the pico cell excluding the cell boundary region in step 1105. Afterward, the pico eNB schedules the UEs in the subframes in consideration of the CSI restriction pattern. That is, the pico eNB schedules the UEs located at the cell boundary region in ABSs in step 1107. The pico eNB also schedules the UE located in the pico cell excluding the cell boundary region in non-ABSs in step 1109.

Figure 12:
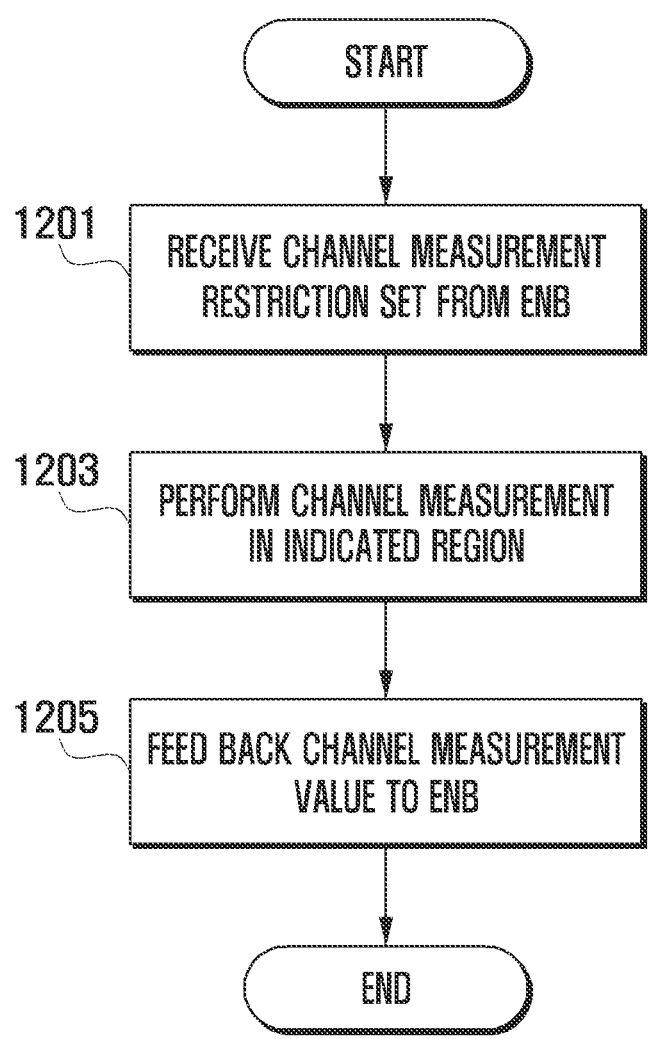
FIG. 12 is a flowchart illustrating a User Equipment (UE) procedure for channel measurement feedback in a resource management method according to the second exemplary embodiment of the present invention.

FIG. 12 is a flowchart illustrating a UE procedure for channel measurement feedback in a resource management method according to the second exemplary embodiment of the present invention.

Referring to FIG. 12, the UE receives a restriction set as the reference resource configuration set for channel measurement from a pico eNB in step 1201. Next, the UE performs channel measurement only in the subframes indicated by the received set in step 1203. Next, the UE feeds back the channel measurement value to the pico eNB through a channel measurement feedback method in step 1205.

If the pico eNB transmits a CSI restriction set configured to be equal to the ABS set or a subset of the ABS set to all of the UEs, each UE feeds back the channel measurement value using all of the resources and then the channel measurement value using only the restriction set. A more detailed description thereon is made with reference to FIGS. 13 and 14.

Figure 13:
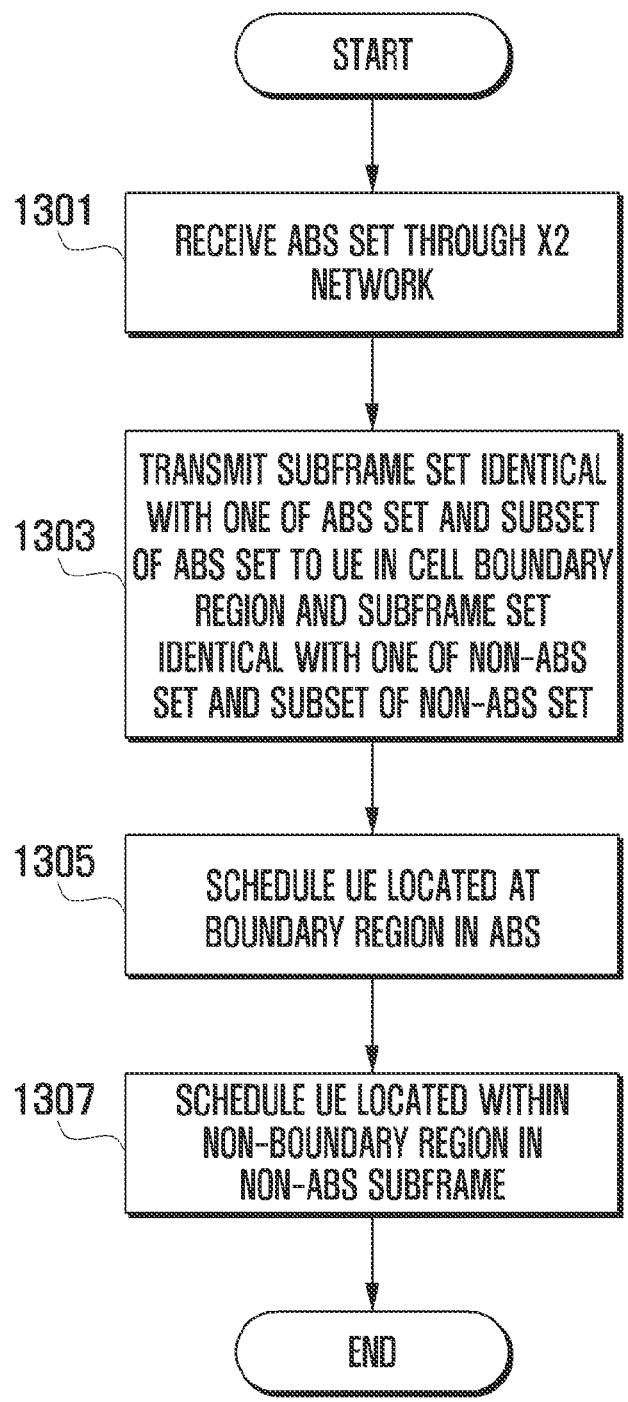
FIG. 13 is a flowchart illustrating a pico eNB procedure for scheduling based on ABS configuration information in a resource management method according to a third exemplary embodiment of the present invention.

FIG. 13 is a flowchart illustrating a pico eNB procedure for scheduling based on ABS configuration information in a resource management method according to a third exemplary embodiment of the present invention.

Referring to FIG. 13, the pico eNB receives an ABS set from the macro eNB through an X2 network in step 1301. Next, the pico eNB transmits a set equal to one of the ABS set and a subset of the ABS set to the UEs at the cell boundary region, and/or one of a set equal to the non-ABS set and a subset of the non-ABS set to the UEs in the pico cell excluding the cell boundary region in step 1303. Next, the pico eNB schedules the UEs at the cell boundary region in the ABS subframes in step 1305. The pico eNB also schedules the UEs within the pico cell excluding the cell boundary region in the non-ABS subframes.

Figure 14:
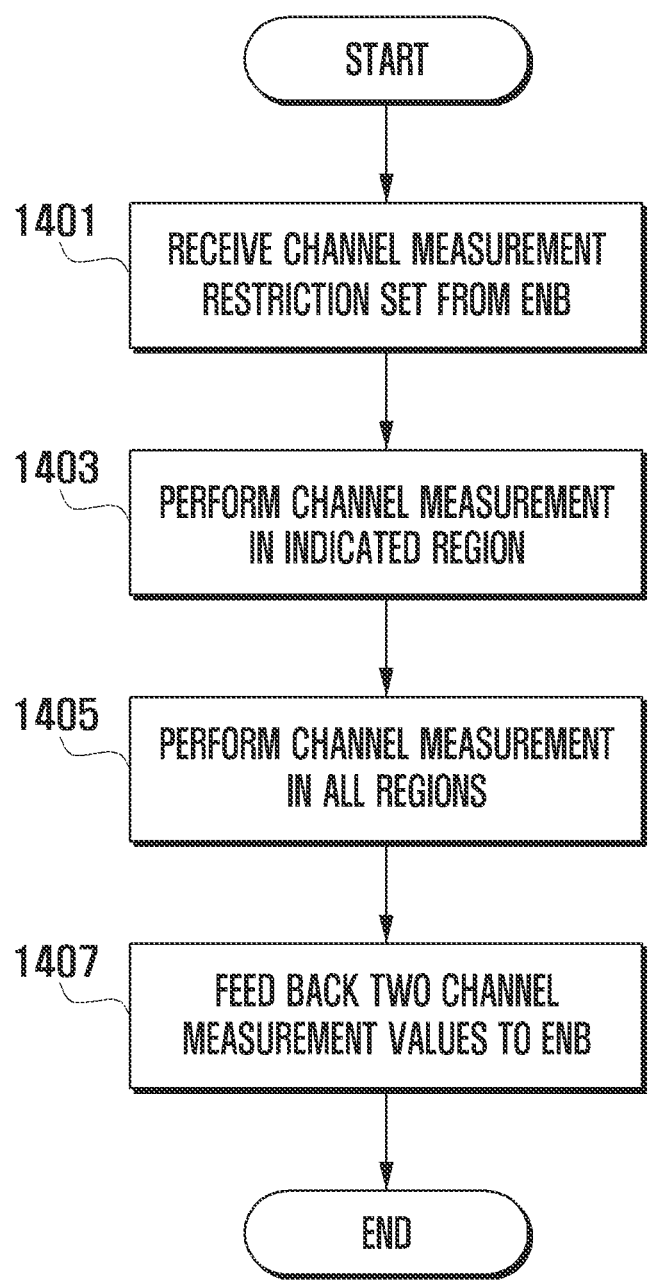
FIG. 14 is a flowchart illustrating a UE procedure for channel measurement feedback in a resource management method according to the third exemplary embodiment of the present invention.

FIG. 14 is a flowchart illustrating a UE procedure for channel measurement feedback in a resource management method according to the third exemplary embodiment of the present invention.

Referring to FIG. 14, the UE receives a channel measurement restriction set from a pico cell in step 1401. Here, the channel measurement restriction set denotes one of an ABS set and a subset of the ABS set. Next, the UE performs channel measurement in subframes indicated by the channel measurement restriction set in step 1403. Next, the UE performs channel measurement in all of the subframes in step 1405. Finally, the UE feeds back the two channel measurement values to the pico eNB in step 1407.

In the channel measurement feedback process, the feedback using the entire resource is performed with combined measurement of the interferences measured in ABSs and non-ABSs. In a case of using the CSI restriction set, the interference measured in one of ABSs and non-ABSs. Accordingly, the pico eNB can separate the interference measured in AB Ss and the interference measured in non-ABS from each other using two values.

A method for a UE to feed back the channel measurement values measured according to the two different CSI restriction sets transmitted by the pico eNB is described with reference to FIGS. 15 and 16. Here, the pico eNB transmits the restriction set equal to the ABS set on time axis or a subset of the ABS set and another restriction set equal to the non-ABS set or a subset of the non-ABS set to the UE such that the UE feeds back the channel measurement values corresponding to both the restriction sets.

Figure 15:
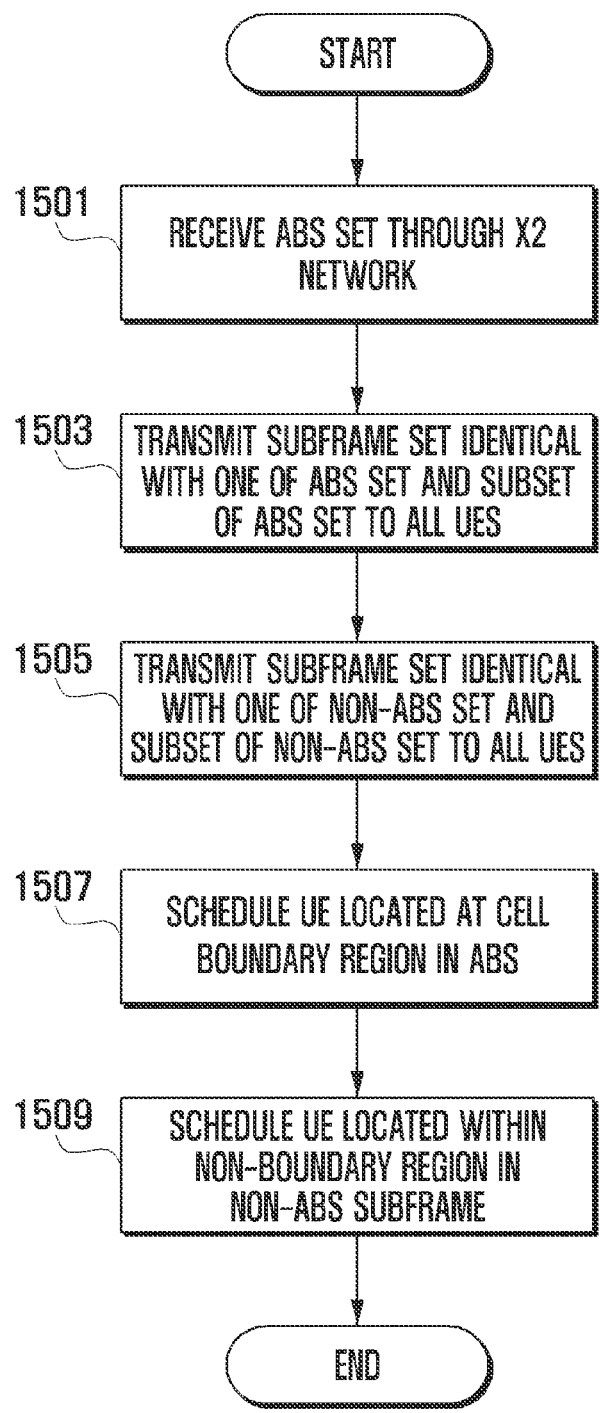
FIG. 15 is a flowchart illustrating a pico eNB procedure for scheduling based on ABS configuration information in a resource management method according to a fourth exemplary embodiment of the present invention.

FIG. 15 is a flowchart illustrating a pico eNB procedure for scheduling based on ABS configuration information in a resource management method according to a fourth exemplary embodiment of the present invention.

Referring to FIG. 15, the pico eNB receives an ABS set transmitted by a macro eNB through an X2 network in step 1501. Next, the pico eNB transmits a set equal to one of the ABS set and a subset of the ABS set to all of the UEs in step 1503. Next, the pico eNB transmits a set equal to one of a non-ABS set and a subset of the non-ABS set in step 1505.

Afterward, the pico eNB schedules the UEs located at a cell boundary region in the ABSs in step 1507. Finally, the pico eNB schedules the UEs located within the pico cell excluding the cell boundary region in step 1509.

Figure 16:
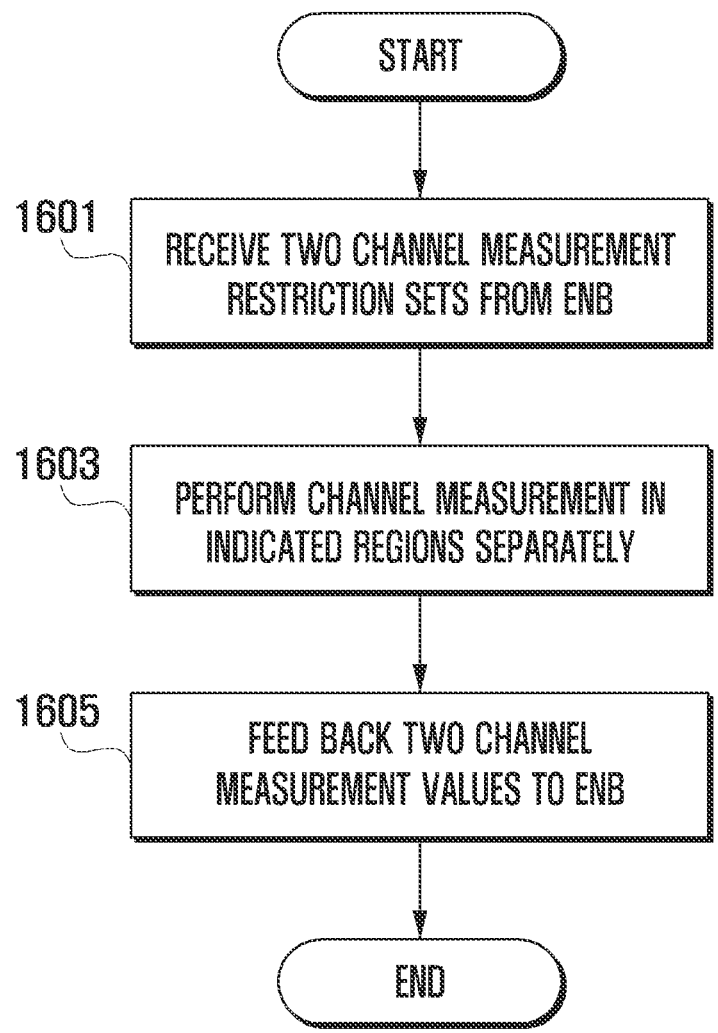
FIG. 16 is a flowchart illustrating a UE procedure for channel measurement feedback in a resource management method according to the fourth exemplary embodiment of the present invention.

FIG. 16 is a flowchart illustrating a UE procedure for channel measurement feedback in a resource management method according to the fourth exemplary embodiment of the present invention.

Referring to FIG. 16, the UE receives two channel measurement restriction sets from the pico eNB in step 1601. The UE performs channel measurement in the subframes indicated by the two channel measurement restriction sets separately in step 1603. That is, the UE performs channel measurement in the subframes indicated by the channel measurement restriction set and then in all of the subframes. Finally, the UE feeds back the two channel measurement values to the pico eNB in step 1605. In this case, the UE feeds back the two channel measurement values in different resource regions separated in time.

Figure 17:
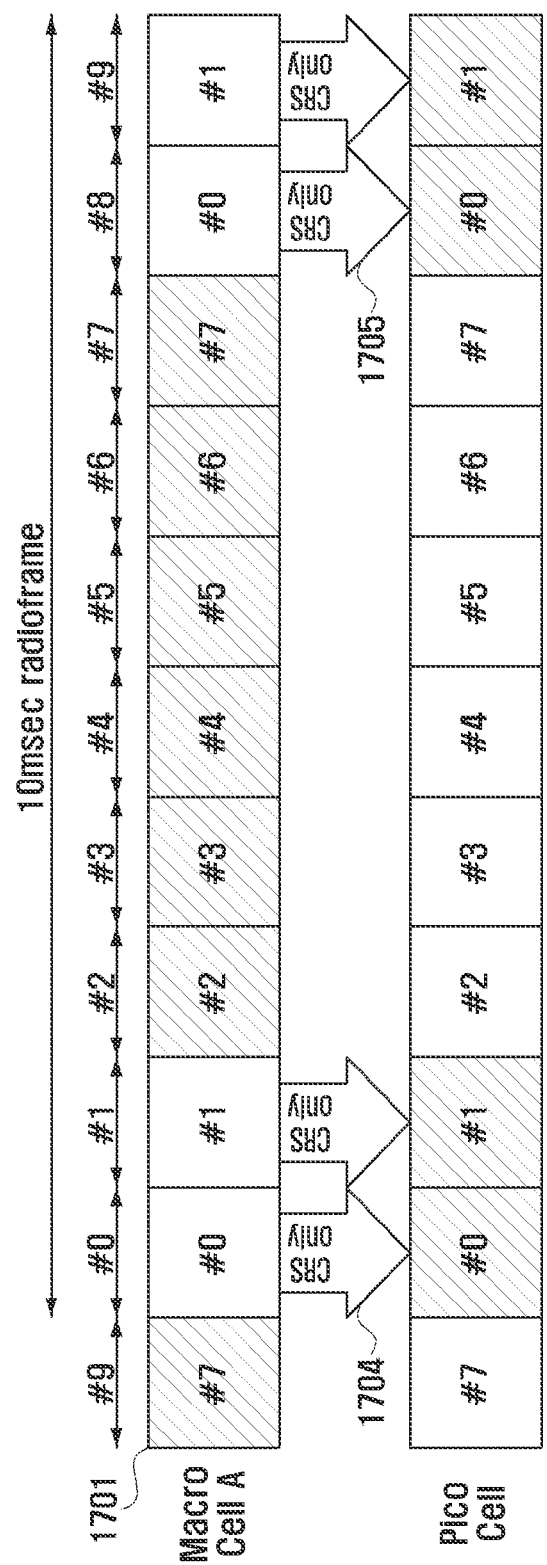
FIG. 17 is a diagram illustrating a principle of configuring an ABS set in a resource management method according to a fifth exemplary embodiment of the present invention.

FIG. 17 is a diagram illustrating a principle of configuring an ABS set in a resource management method according to a fifth exemplary embodiment of the present invention.

Referring to FIG. 17, in the ABS pattern configuration procedure according to the fifth exemplary embodiment of the present invention, the ABS pattern is configured as the sum of the resources including HARQ processes 1704 and 1705 in at least the subframes 4 and 9 in the situation where N contiguous ABSs occur always in contiguous 8 HARQ processes as denoted by reference number 1701. In a case where contiguous ABSs exist, the eNB can perform transmission to the UE with maximum transmission power.

In a case of an ABS, the eNB transmits no signal but reference signals. At the same instance, the transmission powers of neighbor macro eBNs can be changed. Since the transmission/reception timing is determined by the eNB to which the UE is attached, interference may occur due to the variation of the transmission power before and after the ABS, according to the distance from neighbor eBN or channel state. Due to the probability of interference caused by the variation of transmission power with non-contiguous ABSs, it is preferred to configure such that contiguous ABSs exist.

Figure 18:
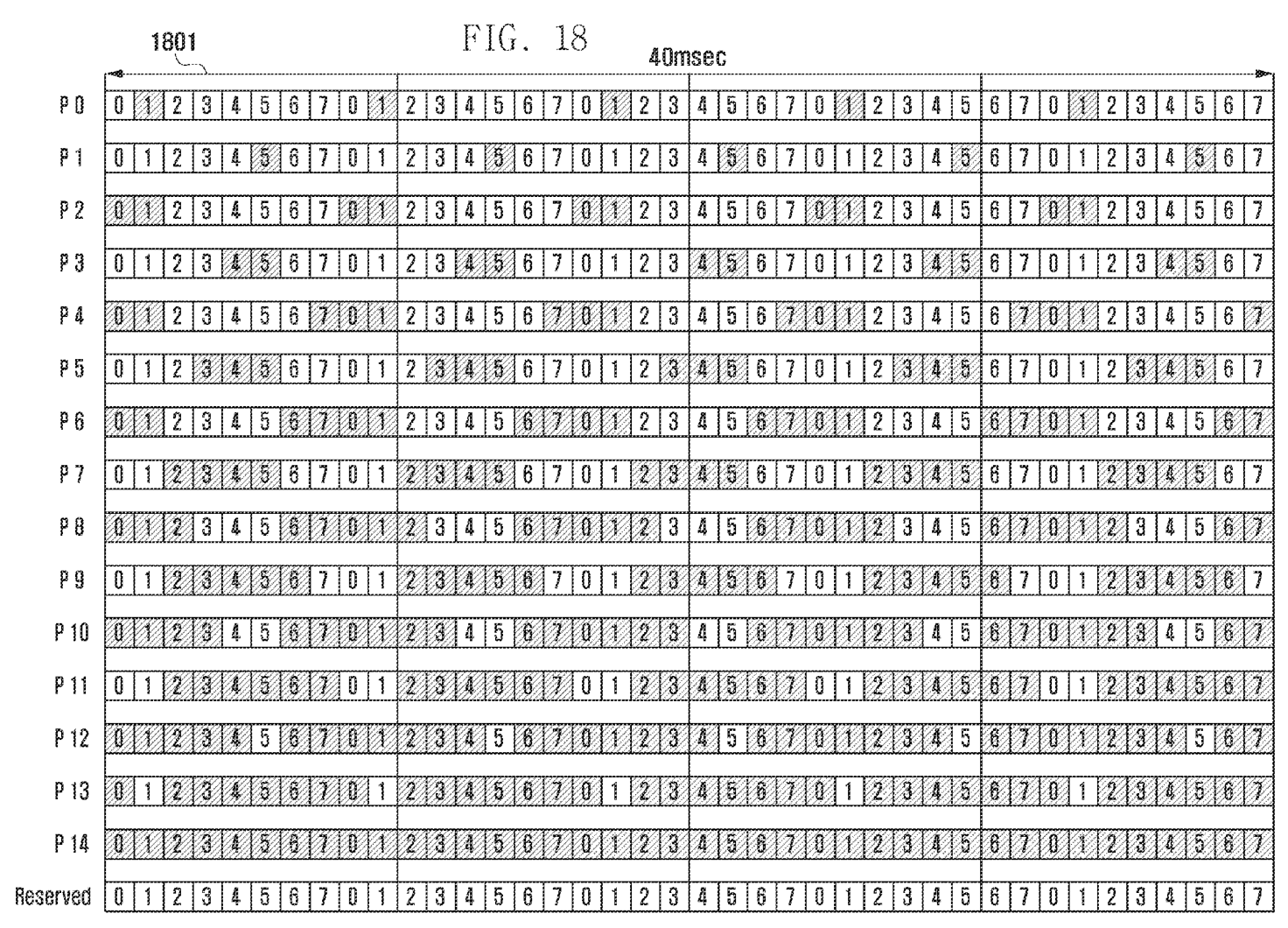

FIG. 18 is a diagram illustrating a principle of ABS configuration for use in a resource management method according to the fifth exemplary embodiment of the present invention. Referring to FIG. 18, an ABS with 40 msec 1801 is shown. The ABS set can be configured in the pattern of P0, P3, P5, P7, P9, P11, and P13 or the pattern of P1, P2, P4, P4, P8, P10, and P12 but not in mixed manner.

Figure 19:
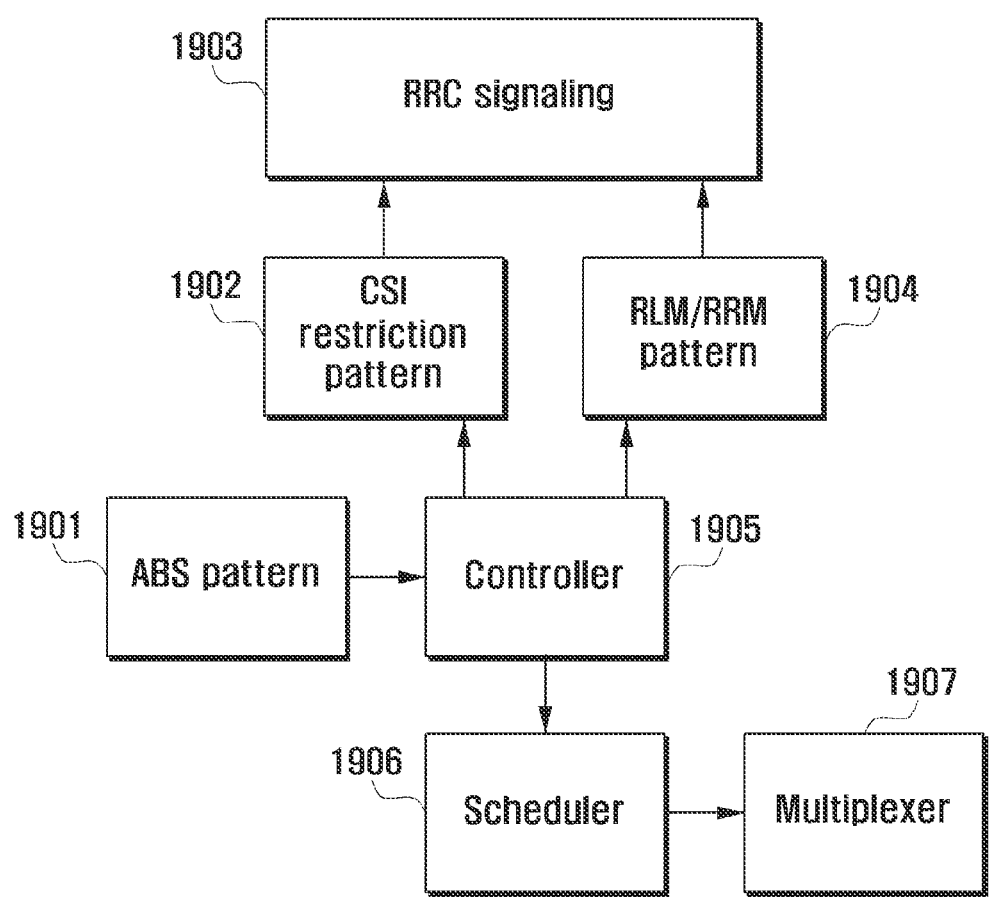
FIG. 19 is a block diagram illustrating a configuration of a transmitter of an eNB according to an exemplary embodiment of the present invention.

FIG. 19 is a block diagram illustrating a configuration of a transmitter of an eNB according to an exemplary embodiment of the present invention.

Referring to FIG. 19, if an ABS pattern 1901 is received from a macro eNB, the controller 1905 determines a CSI restriction set 1902 and an RLM/RRM set 1904. Next, the controller 1905 transmits the CSI restriction set 1902 and the RLM/RRM set 1904 to a UE through RRC signaling 1903. The CSI restriction set 1902 and the RLM/RRM set 1904 can be transmitted in a single pattern. The RLM/RRM set 1904 is configured so as to be equal to the ABS pattern 1901 and as a subset of the ABS pattern. The controller 1905 controls the scheduler 1906 to schedule UE data and the multiplexer 1907 to multiplex the UE data into the subframes according the location of the UE.

Figure 20:
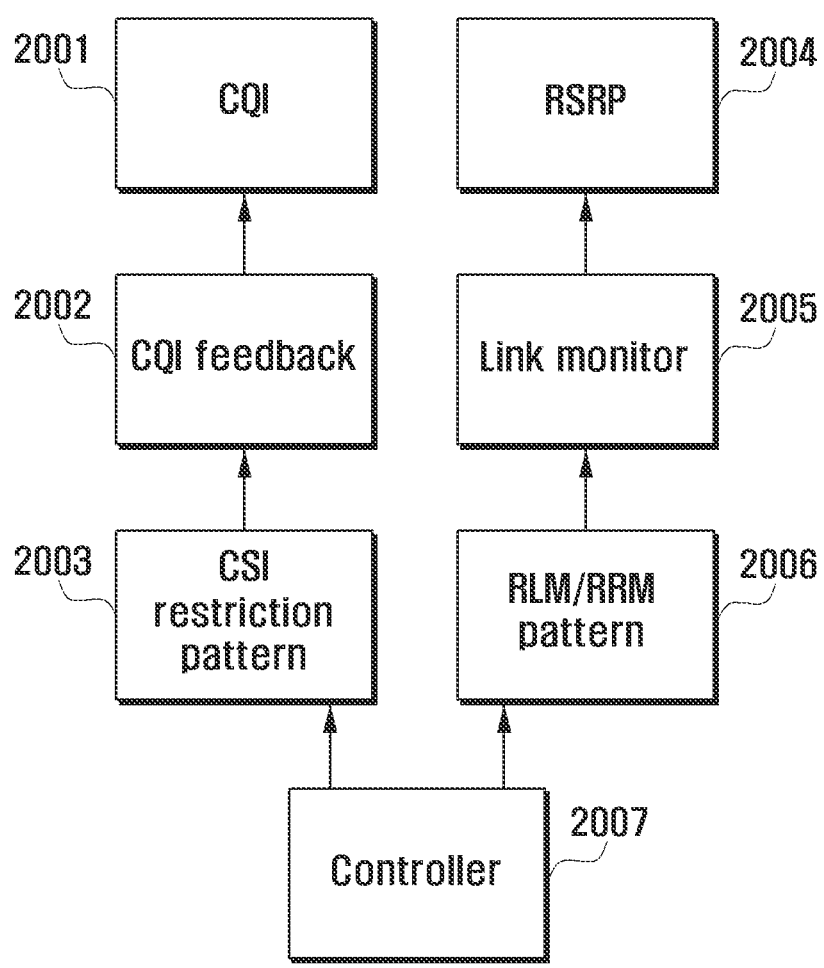
FIG. 20 is a block diagram illustrating a configuration of a receiver of a UE according to an exemplary embodiment of the present invention.

FIG. 20 is a block diagram illustrating a configuration of a receiver of a UE according to an exemplary embodiment of the present invention.

Referring to FIG. 20, the controller 2007 measures Channel Quality Indicator (CQI) feedback 2002 using the CSI restriction set 2003 received from an eNB. The UE can generate one or more CQI feedbacks according to any of the exemplary embodiments of the present invention. The measured CQI 2001 is transmitted to the eNB.

The controller 2007 also measures the Reference Signal Received Power (RSRP) by means of the link monitor 2005 based on the RLM/RRM pattern 2006 to determine whether to connect to the current cell. The measured RSRP 2004 is fed back to the eNB. The RSRP refers to the measurement value of the received power of the reference signal.

As described above, the resource management system and method of exemplary embodiments of the present invention are capable of mitigating interference to the UE located in a pico cell by configuring the subframe resource with the sum of time resources in a unit of 8 msec in consideration of HARQ processes in 10 msc-long subframes having index number of 4 and/or 9. The resource management system and method of exemplary embodiments of the present invention are capable of maximizing the capacity of a pico cell by using the received system information.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A resource management method of a base station for interference coordination in a wireless communication system, the method comprising:
   receiving almost blank subframe (ABS) information from another base station;
   generating, based on the ABS information, configuration information indicating two subframe sets comprising a first subframe set and a second subframe set for measuring channels;
   transmitting the generated configuration information to a terminal;
   receiving channel measurement information from the terminal, the channel measurement information being generated based on at least one of the two subframe sets; and
   scheduling the terminal based on the ABS information and the channel measurement information,
   wherein each of the first subframe set and the second subframe set comprise at least one subframe among 40 subframes for channel measurement,
   wherein the first subframe set and the second subframe set do not comprise same subframe, and
   wherein the transmitting of the generated configuration information indicating two subframe sets comprises:
      transmitting, if the terminal is located in a boundary region of a cell of the base station, first configuration information indicating the first subframe set, and
      transmitting, if the terminal is located in a non-boundary region of the cell, second configuration information indicating the second subframe set.

2. The method of claim 1, wherein all subframes including an ABS from among the first subframe set and the second subframe set transmit reference signals.

3. The method of claim 2, wherein the subframes including an ABS from among the first subframe set and the second subframe set further comprise a sum of resources assigned for Hybrid Automatic Repeat Request (HARQ) processes configured at a Round Trip Time (RTT) interval.

4. The method of claim 1, wherein the receiving of the ABS information comprises receiving the ABS information through an X2 network.

5. The method of claim 1, wherein all subframes from among the first subframe set and the second subframe set transmit a reference signal regardless of an ABS.

6. A channel feedback method of a terminal, the method comprising:
   receiving configuration information indicating two subframe sets comprising a first subframe set and a second subframe set for measuring channels from a base station, the configuration information being generated based on almost blank subframe (ABS) information;
   measuring the channels from the base station based on at least one of the two subframe sets; and
   transmitting channel measurement information to the base station,
   wherein each of the first subframe set and the second subframe set comprise at least one subframe among 40 subframes for channel measurement,
   wherein the first subframe set and the second subframe set do not comprise same subframe, and
   wherein the receiving of the configuration information indicating two subframe sets comprises:
      receiving, if the terminal is located in the boundary region of the cell of the base station, first configuration information indicating first subframe set, and
      receiving, if the terminal is located in non-boundary region of the cell, second configuration information indicating the second subframe set.

7. The method of claim 6, wherein the transmitting comprises:
   measuring the channels in all subframes including an ABS; and
   transmitting the channel measurement information of all of the subframes comprising the ABS.

8. The method of claim 6, wherein the receiving of the configuration information indicating two subframe sets further comprises:
   receiving a Radio Link Monitor/Radio Resource Measurement (RLM/RRM) for radio resource measurement from the base station.

9. The method of claim 6, wherein all subframes from among the first subframe set and the second subframe set comprising an almost blank subframe (ABS) transmit a reference signals.

10. The method of claim 6, wherein all subframes from among the first subframe set and the second subframe set transmit a reference signal regardless of an ABS.

11. A base station for resource management, the base station comprising:
   a transceiver configured to transmit and receive a signal;
   a controller configured to receive almost blank subframe (ABS) information from another base station, to generate, based on the ABS information, configuration information indicating two subframe sets comprising a first subframe set and a second subframe set for measuring channels, to transmit the generated configuration information to a terminal, to receive channel measurement information from the terminal, the channel measurement information being generated based on at least one of the two subframe sets, and to schedule the terminal based on the ABS information and the channel measurement information,
   wherein each of the first subframe set and the second subframe set comprise at least one subframe among 40 subframes for channel measurement,
   wherein the first subframe set and the second subframe set do not comprise same subframe, and
   wherein the controller is further configured to:
      transmit, if the terminal is located in a boundary region of a cell of the base station, first configuration information indicating the first subframe set, and
      transmit, if the terminal is located in non-boundary region of the cell, second configuration information indicating the second subframe set.

12. The base station of claim 11, wherein all the subframes including an ABS from among the first subframe set and the second subframe set transmit reference signals.

13. The base station of claim 12, wherein the subframes including the ABS from among the first subframe set and the second subframe set further include the first subframe set including at least one of subframes indexed by 1 and 4 and the second subframe set including no subframes indexed by 1 and 4.

14. The base station of claim 11, wherein the controller is configured to receive the ABS information through an X2 network.

15. The base station of claim 11, wherein all subframes from among the first subframe set and the second subframe set transmit a reference signal regardless of an ABS.

16. A terminal for controlling interference in a wireless communication system, the terminal comprising;
a transceiver configured to transmit and receive a signal;
a controller configured to receive configuration information indicating two subframe sets comprising a first subframe set and a second subframe set for measuring channels from a base station, the configuration information being generated based on almost blank subframe (ABS) information, and measure the channels from the base station based on at least one of the two subframe sets and transmit channel measurement information to the base station,
wherein each of the first subframe set and the second subframe set comprise at least one subframe among 40 subframes for channel measurement,
wherein the first subframe set and the second subframe set do not comprise same subframe, and
wherein the controller is further configured to:
receive, if the terminal is located in a boundary region of a cell of the base station, first configuration information indicating first subframe set, and
receive, if the terminal is located in non-boundary region of the cell, second configuration information indicating the second subframe set.

17. The terminal of claim 16, wherein the controller is configured to measure individual channels in the first subframe set and the second subframe set and transmits two channel measurement information.

18. The terminal of claim 16, wherein all subframes from among the first subframe set and the second subframe set comprising an almost blank subframe (ABS) transmit a reference signals.

19. The terminal of claim 16, wherein the controller is further configured to receive a Radio Link Monitor/Radio Resource Measurement (RLM/RRM) for radio resource measurement from the base station.

20. The terminal of claim 16, wherein all subframes from among the first subframe set and the second subframe set transmit a reference signal regardless of an ABS.

* * * * *